(12) United States Patent
Andreopoulos

(10) Patent No.: US 10,970,622 B2
(45) Date of Patent: Apr. 6, 2021

(54) DYNAMIC GATING USING NEUROMORPHIC HARDWARE

(71) Applicant: INTERNATIONAL BUSINESS MACHINES CORPORATION, Armonk, NY (US)

(72) Inventor: Alexander Andreopoulos, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 861 days.

(21) Appl. No.: 15/405,824

(22) Filed: Jan. 13, 2017

(65) Prior Publication Data

US 2018/0204109 A1     Jul. 19, 2018

(51) Int. Cl.
*G06N 3/063* (2006.01)
*G06N 3/04* (2006.01)

(52) U.S. Cl.
CPC ............ *G06N 3/063* (2013.01); *G06N 3/049* (2013.01)

(58) Field of Classification Search
CPC .............................. G06N 3/063; G06N 3/049
See application file for complete search history.

(56) References Cited

U.S. PATENT DOCUMENTS

| | | |
|---|---|---|
| 8,369,652 B1 | 2/2013 | Khosla et al. |
| 9,196,053 B1 | 11/2015 | Huber et al. |
| 2004/0181497 A1* | 9/2004 | Dodgson ............... H04L 27/20 706/23 |
| 2006/0215922 A1 | 9/2006 | Koch et al. |
| 2013/0151451 A1* | 6/2013 | Lee ........................ G06N 3/049 706/27 |
| 2014/0219497 A1 | 8/2014 | Richert |
| 2014/0222739 A1* | 8/2014 | Ponulak ............... G06N 3/049 706/25 |
| 2014/0258195 A1 | 9/2014 | Weng et al. |
| 2015/0269439 A1 | 9/2015 | Versace et al. |

(Continued)

FOREIGN PATENT DOCUMENTS

EP          2256667 A1     12/2010

OTHER PUBLICATIONS

Zhao, Rui-Wei, et al. "Regional Gating Neural Networks for Multi-label Image Classification." BMVC. 2016. (Year: 2016).*

(Continued)

*Primary Examiner* — Daniel T Pellett
(74) *Attorney, Agent, or Firm* — Erik Huestis; Stephen Kenny; Foley Hoag, LLC

(57) ABSTRACT

Dynamic gating for neuromorphic systems and the configuration thereof are provided. In various embodiments, neurosynaptic system comprises a neurosynaptic core. The neuromorphic core comprises a plurality of neurons and axons. The neurosynaptic core comprises a programmable gate operative to receive a control signal and selectively output a first output signal based on the control signal. In various embodiments, a plurality of input parameters are read, defining the behavior of a programmable gate. Based upon the plurality of input parameters, a neurosynaptic core is configured to provide a programmable gate operative to receive a control signal and selectively output a first output signal based on the control signal.

18 Claims, 19 Drawing Sheets

(56) References Cited

U.S. PATENT DOCUMENTS

2016/0004931 A1* 1/2016 Andreopoulos ..... G06K 9/4676
382/158
2016/0034812 A1* 2/2016 Gibson ................... G06N 3/08
706/25
2019/0265955 A1* 8/2019 Wolf ...................... G06N 3/084

OTHER PUBLICATIONS

Yu, Theodore, and Gert Cauwenberghs. "Analog VLSI neuromorphic network with programmable membrane channel kinetics." 2009 IEEE International Symposium on Circuits and Systems (ISCAS). IEEE, 2009. (Year: 2009).*

D. Sonnleithner and G. Indiveri, "A Neuromorphic Saliency-Map based Active Vision System," (2011).

* cited by examiner

DYNAMIC GATING USING NEUROMORPHIC HARDWARE

BACKGROUND

Embodiments of the present invention relate to neurosynaptic systems and the configuration thereof, and more specifically, to dynamic gating using neuromorphic hardware.

BRIEF SUMMARY

According to various embodiments of the present disclosure, neurosynaptic systems are provided. A neurosynaptic system comprises a neurosynaptic core. The neuromorphic core comprises a plurality of neurons and axons. The neurosynaptic core comprises a programmable gate operative to receive a control signal and selectively output a first output signal based on the control signal.

According to various embodiments of the present disclosure, methods of and computer program products for configuring a neurosynaptic system are provided. A plurality of input parameters are read, defining the behavior of a programmable gate. Based upon the plurality of input parameters, a neurosynaptic core is configured to provide a programmable gate operative to receive a control signal and selectively output a first output signal based on the control signal.

DETAILED DESCRIPTION

Figure 1:
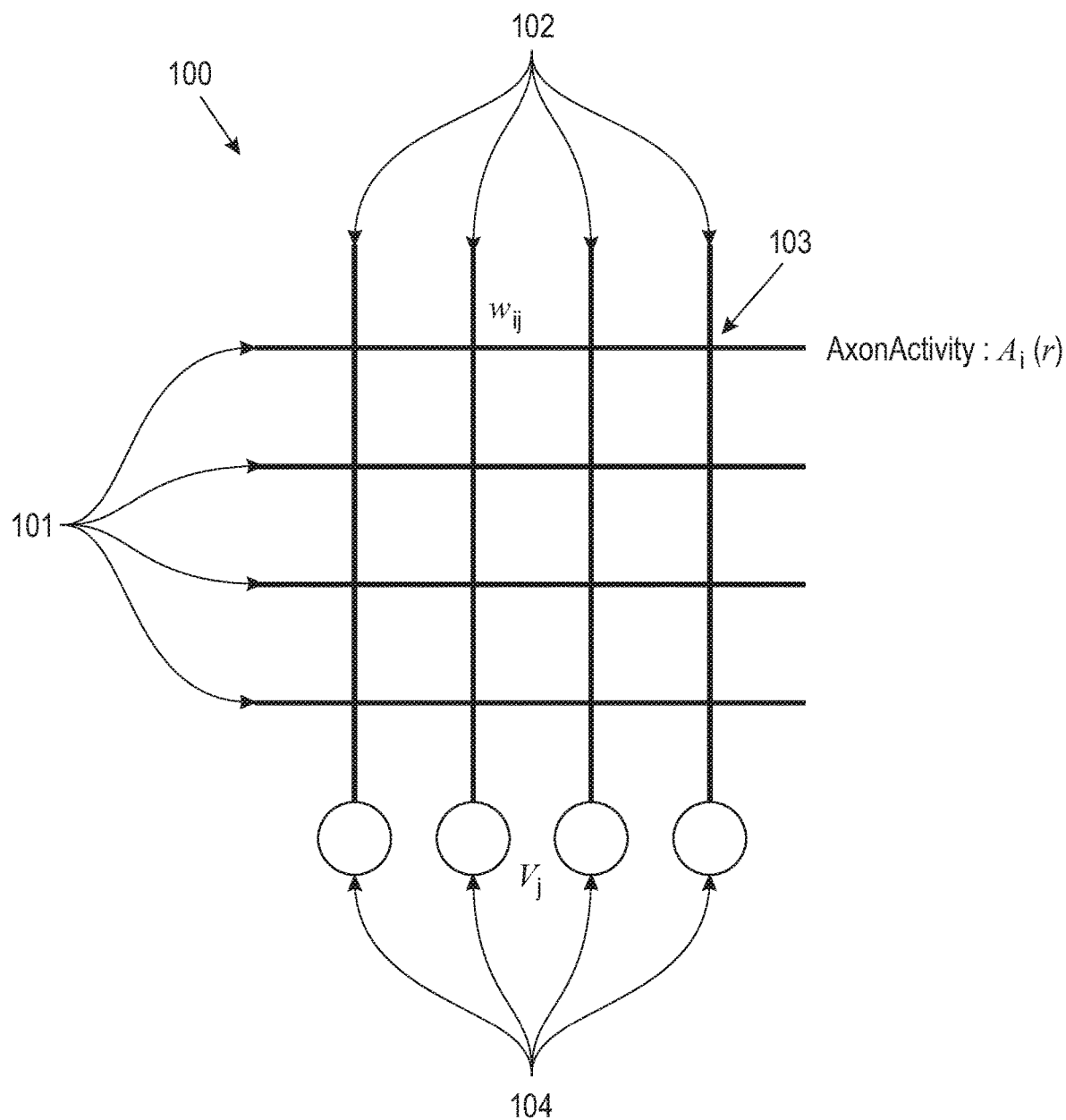
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program.

A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In various exemplary neuromorphic systems, such as TrueNorth, neuron activity may be described by the following equations. In particular, synaptic integration is provided according to Equation 1. Leak integration is provided according to Equation 2 and Equation 3. At each tick, a spike is generated where a threshold potential is crossed. In particular, for $\eta_j$ according to Equation 4, if $V_j(t) \geq \alpha_j + \eta_j$, then a spike is generated and $V_j(t)$ is reset according to Equation 5. If $V_j(t) \leq -[\beta_j \kappa_j + (\beta_j + \eta_j)(1 - \kappa_j)]$, $V_j(t)$ is reset according to Equation 6.

$$V_j(t) = V_j(t-1) + \sum_{i=0}^{255} A_i(t) w_{i,j} [(1 - b_j^{G_i}) s_j^{G_i} + b_j^{G_i} F(s_j^{G_i}, \rho_{i,j}) \text{sgn}(s_j^{G_i})] \quad \text{Equation 1}$$

$$\Omega = (1 - \epsilon_j) + \epsilon_j \text{sgn}(V_j(t)) \quad \text{Equation 2}$$

$$V_j(t) = V_j(t) + \Omega[(1 - c_j^\lambda)\lambda_j + c_j^\lambda F(\lambda_j, \rho_j^\lambda) \text{sgn}(\lambda_j)] \quad \text{Equation 3}$$

$$\eta_j = \rho_j^T \,\&\, M_j \quad \text{Equation 4}$$

$$V_j(t) = \delta(\gamma_j) R_j + \delta(\gamma_j - 1)(V_j(t) - (\alpha_j + \eta_j)) + \delta(\gamma_j - 2) V_j(t) \quad \text{Equation 5}$$

$$V_j(t) = -\beta_j \kappa_j + [-\delta(\gamma_j) R_j + \delta(\gamma_j - 1)(V_j(t) + (\beta_j + \eta_j)) + \delta(\gamma_j - 2) V_j(t)](1 - \kappa_j) \quad \text{Equation 6}$$

In various neuron specifications, different symbols may be used for the various neuron parameters above. For example: sigma(i)S(i)=$s_j^{G_i-1}$ (for i=1,2,3,4); alpha=$\alpha_j$; lmda*sigma_l=$\lambda_j$; epsilon=$\epsilon_j$; beta=$\beta_j$; kappa=$k_j$; gamma=$\gamma_j$; sigmaVR*$(2^{VR}-1)$=$R_j$,$V_m$=$V_j(0)$. When not expressly defined, the above may be assumed have a default value of 0. In general, i is used as an index to a corresponding array, as in sigma(i) or S(i). In Equation 4, $\eta_j = \rho_j^T \,\&\, M_j$ denotes the logical AND of a random number generator $\rho_j^T$ with the first $M_j$ bits of its binary representation. For example, for $M_j$==8, this returns a random 8 bit number in 0-255 and for $M_j$==0, $\eta_j$ is always zero (and thus is not random). This is useful for stochastic rate store neurons.

In the era of heterogeneous computing, programmers will be either domain experts or sophisticated computer scientists because few domain experts have the time to develop performance programming skills and few computer scientists have the time to develop domain expertise. The latter group will create frameworks and software stacks that enable domain experts to develop applications without understanding details of the underlying platforms. Some of the potential benefits of heterogeneity include: more efficient use of memory bandwidth, more performance per unit area, more performance per watt, and fewer modules, boards, or racks. The above-outlined neural computation and neuromorphic hardware are examples of a domain specific computing approach, improving performance per watt over traditional von Neumann approaches.

Within this context many neural computations require the ability to dynamically gate information. From a neuroscience perspective, this refers to mechanisms for interrupting or allowing the passage of action potentials between different cortical neurons. From the viewpoint of a programmer of neurosynaptic architectures, the source of this information might be external and non-deterministic (e.g., a camera), the output of some algorithm running on a von Neumann architecture (sent for further processing to neuromorphic hardware), or multiple neuromorphic routines running on neuromorphic hardware and exchanging spikes.

Numerous fundamental routines in neuromorphic systems may be implemented in terms of dynamically controlled gates. These include, for example, time division demultiplexers that dynamically route each set of inputs to one or more of multiple outputs, gating mechanisms for feedforward and feedback attention beams, indexing mechanisms, counters, and indicator functions for complex arithmetic operations.

A variety of methods and systems are provided herein for setting up gating circuits and using multiple such routines. In various embodiments, the selection of user interface modes for controlling such gating neurons as well as systems and methods for defining the actual functional behavior of such neurons are provided. In some embodiments, spiking based mechanisms are provided for dynamically controlling when a gate is open or closed for both binary and rate coded inputs. In some embodiments, a user is able to choose whether the gate is initially open or closed. In some embodiments, the user is able to select whether the gate should be open or closed upon reset. In some embodiments, the user is able to choose whether she should be able to open or close the gates, or whether it should be done automatically or periodically. In some embodiments, given multiple gating neurons, the user is able to choose whether they should be able to control the gates using a single axon or whether it should be possible to individually control each gating neuron.

In some embodiments, a time division demultiplexer is provided using these gating neuron behaviors.

Gating mechanisms as provide herein make the programming of neuromorphic architectures significantly easier. In addition, this functionality enables a hybrid model where a neuromorphic system such as a TrueNorth program seamlessly interacts with a von Neumann architecture. Extremely complex behaviors may be implemented by composing instances of these gating routines.

Synaptic gating generally refers to the suppression or facilitation of specific synaptic activity by neural circuits which serve as gates. Synaptic gating provides a mechanism for controlling neuronal output, which includes gatekeeper neurons that influence the transmission of information to selected targets. Various types of gating mechanisms may be implemented, including those where the gate is open/closed when the gating signal is on/off and those where when the gating signal is present, inhibitory interneurons fire, suppressing activity and closing the gate (i.e., negation). Network rhythms may also be used as a gating mechanism, such that whether the input arrives at the peak or the lowest part of the cycle of inhibition determines gate state.

According to various embodiments, a variety of gating neurons are provided. Finite state machine diagrams and the actual neuron parameters are given in the below tables and included figures.

Referring to Table 1-Table 4, a list of indexing parameters is provided to characterize each of gating equivalence class according to embodiments of the present disclosure. For each of these equivalence classes, a description of its behavior is provided. In the tables, Gamma, Input Axons, Control Open Local, Control Open Global, Control Close Local, Control Close Global, Override Value, Default Gate Open, Uses Threshold, and Gate Equivalence Class ID parameters are provided, whose definitions follow. Table 1 provides the equivalence classes for gamma=0 and no input axons. Table 2 provides the equivalence classes for gamma=0 and input axons. Table 3 provides the equivalence classes for gamma=1 and no input axons. Table 4 provides the equivalence classes for gamma=1 and input axons.

Gamma: assumes a value of 0/1 and indicates the gamma value of the neuron. In general a gamma value of 0 denotes a binary output for the neuron and a value of 1 denotes a rate coded output for the neuron. See the actual equivalence class definition descriptions for more details.

Input Axons: assumes a value of true/false and denotes whether non-control input axons are used.

Control Open Local: assumes a Boolean value and indicates whether a distinct open axon will be available for each neuron in each core, enabling independent open control of each gate. In general an open axon opens the gate by releasing whatever was retained behind the gate. The individual neuron definitions provided below include more details.

Control Open Global: assumes a Boolean value and indicates whether a single shared open axon will be available for all neurons in each core. It makes it efficient axon-wise to open all gates in a core. Note that it is possible to mix global and local open axons. In general, an open axon opens the gate by releasing whatever was retained behind the gate. Refer to the individual neuron definitions for more details.

Control Close Local: assumes a Boolean value and indicates whether a distinct close axon will be available for each neuron in each core, enabling independent close control of each gate. In general, a close axon closes the gate by requiring a subsequent new open signal to release whatever will henceforth be retained behind the gate. Refer to the individual neuron definitions for more details.

Control Close Global: assumes a Boolean value and indicates whether a single shared close axon will be available for all neurons in each core. It makes it efficient axon-wise to close all gates in a core. Note that it is possible to mix global and local close axons. In general a close axon closes the gate by requiring a subsequent new open signal to release whatever will henceforth be retained behind the gate. Refer to the individual neuron definitions for more details.

Override Value: An override value (0-2) used to distinguish between neurons with similar parameters but slightly different desired behavior.

Default Gate Open: A Boolean indicating whether the gate will be open by default at the start of the simulation.

Uses Threshold: Certain gates use a threshold. This Boolean indicates whether the gate uses a threshold or not.

Gate Equivalence Class ID: An ID for each equivalence class of gating neurons. These equivalence class IDs may be used to describe neurons with similar behavior.

TABLE 1

| Gamma | Input Axons | Control Open Local | Control Open Global | Control Close Local | Control Open Global | Override Value | Default Gate Open | Uses Threshold | Gate Equivalence Class ID |
|---|---|---|---|---|---|---|---|---|---|
| 0 | False | True | True | Any | Any | 0 | True | False | 1 |
| 0 | False | True | True | Any | Any | 0 | False | False | 2 |
| 0 | False | True | False | Any | Any | 0 | True | False | 1 |
| 0 | False | True | False | Any | Any | 0 | False | False | 2 |
| 0 | False | False | True | Any | Any | 0 | True | False | 1 |
| 0 | False | False | True | Any | Any | 0 | False | False | 2 |
| 0 | False | False | False | Any | Any | 1 | True | False | 1 |
| 0 | False | False | False | Any | Any | 1 | False | False | 2 |
| 0 | False | False | False | True | True | 0 | True | False | 3 |
| 0 | False | False | False | True | True | 0 | False | False | 4 |
| 0 | False | False | False | True | False | 0 | True | False | 3 |
| 0 | False | False | False | True | False | 0 | False | False | 4 |
| 0 | False | False | False | False | True | 0 | True | False | 3 |
| 0 | False | False | False | False | True | 0 | False | False | 4 |
| 0 | False | Any | Any | False | False | 2 | True | False | 3 |
| 0 | False | Any | Any | False | False | 2 | False | False | 4 |

TABLE 2

| Gamma | Input Axons | Control Open Local | Control Open Global | Control Close Local | Control Open Global | Override Value | Default Gate Open | Uses Threshold | Gate Equivalence Class ID |
|---|---|---|---|---|---|---|---|---|---|
| 0 | True | True | True | Any | Any | 0 | True | True | 5 |
| 0 | True | True | True | Any | Any | 0 | False | True | 6 |
| 0 | True | True | False | Any | Any | 0 | True | True | 5 |
| 0 | True | True | False | Any | Any | 0 | False | True | 6 |

TABLE 2-continued

| Input Gamma | Axons | Control Open Local | Control Open Global | Control Close Local | Control Open Global | Override Value | Default Gate Open | Uses Threshold | Gate Equivalence Class ID |
|---|---|---|---|---|---|---|---|---|---|
| 0 | True | False | True | Any | Any | 0 | True | True | 5 |
| 0 | True | False | True | Any | Any | 0 | False | True | 6 |
| 0 | True | False | False | Any | Any | 1 | True | True | 5 |
| 0 | True | False | False | Any | Any | 1 | False | True | 6 |
| 0 | True | False | False | True | True | 0 | True | True | 7 |
| 0 | True | False | False | True | True | 0 | True | False | 9 |
| 0 | True | False | False | True | True | 0 | False | True | 8 |
| 0 | True | False | False | True | True | 0 | False | False | 10 |
| 0 | True | False | False | True | False | 0 | True | True | 7 |
| 0 | True | False | False | True | False | 0 | True | False | 9 |
| 0 | True | False | False | True | False | 0 | False | True | 8 |
| 0 | True | False | False | True | False | 0 | False | False | 10 |
| 0 | True | False | False | False | True | 0 | True | True | 7 |
| 0 | True | False | False | False | True | 0 | True | False | 9 |
| 0 | True | False | False | False | True | 0 | False | True | 8 |
| 0 | True | False | False | False | True | 0 | False | False | 10 |
| 0 | True | Any | Any | False | False | 2 | True | True | 7 |
| 0 | True | Any | Any | False | False | 2 | True | False | 9 |
| 0 | True | Any | Any | False | False | 2 | False | True | 8 |
| 0 | True | Any | Any | False | False | 2 | False | False | 10 |

TABLE 3

| Input Gamma | Axons | Control Open Local | Control Open Global | Control Close Local | Control Open Global | Override Value | Default Gate Open | Uses Threshold | Gate Equivalence Class ID |
|---|---|---|---|---|---|---|---|---|---|
| 1 | False | True | True | Any | Any | 0 | True | False | 11 |
| 1 | False | True | True | Any | Any | 0 | False | False | 12 |
| 1 | False | True | False | Any | Any | 0 | True | False | 11 |
| 1 | False | True | False | Any | Any | 0 | False | False | 12 |
| 1 | False | False | True | Any | Any | 0 | True | False | 11 |
| 1 | False | False | True | Any | Any | 0 | False | False | 12 |
| 1 | False | False | False | Any | Any | 1 | True | False | 11 |
| 1 | False | False | False | Any | Any | 1 | False | False | 12 |

TABLE 4

| Input Gamma | Axons | Control Open Local | Control Open Global | Control Close Local | Control Open Global | Override Value | Default Gate Open | Uses Threshold | Gate Equivalence Class ID |
|---|---|---|---|---|---|---|---|---|---|
| 1 | True | True | True | Any | Any | 0 | True | False | 13 |
| 1 | True | True | True | Any | Any | 0 | False | False | 14 |
| 1 | True | True | False | Any | Any | 0 | True | False | 13 |
| 1 | True | True | False | Any | Any | 0 | False | False | 14 |
| 1 | True | False | True | Any | Any | 0 | True | False | 13 |
| 1 | True | False | True | Any | Any | 0 | False | False | 14 |
| 1 | True | False | False | Any | Any | 1 | True | False | 13 |
| 1 | True | False | False | Any | Any | 1 | False | False | 14 |
| 1 | True | False | False | True | True | 0 | True | False | 15 |
| 1 | True | False | False | True | True | 0 | False | False | 16 |
| 1 | True | False | False | True | False | 0 | True | False | 15 |
| 1 | True | False | False | True | False | 0 | False | False | 16 |
| 1 | True | False | False | False | True | 0 | True | False | 15 |
| 1 | True | False | False | False | True | 0 | False | False | 16 |
| 1 | True | Any | Any | False | False | 2 | True | False | 15 |
| 1 | True | Any | Any | False | False | 2 | False | False | 16 |

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
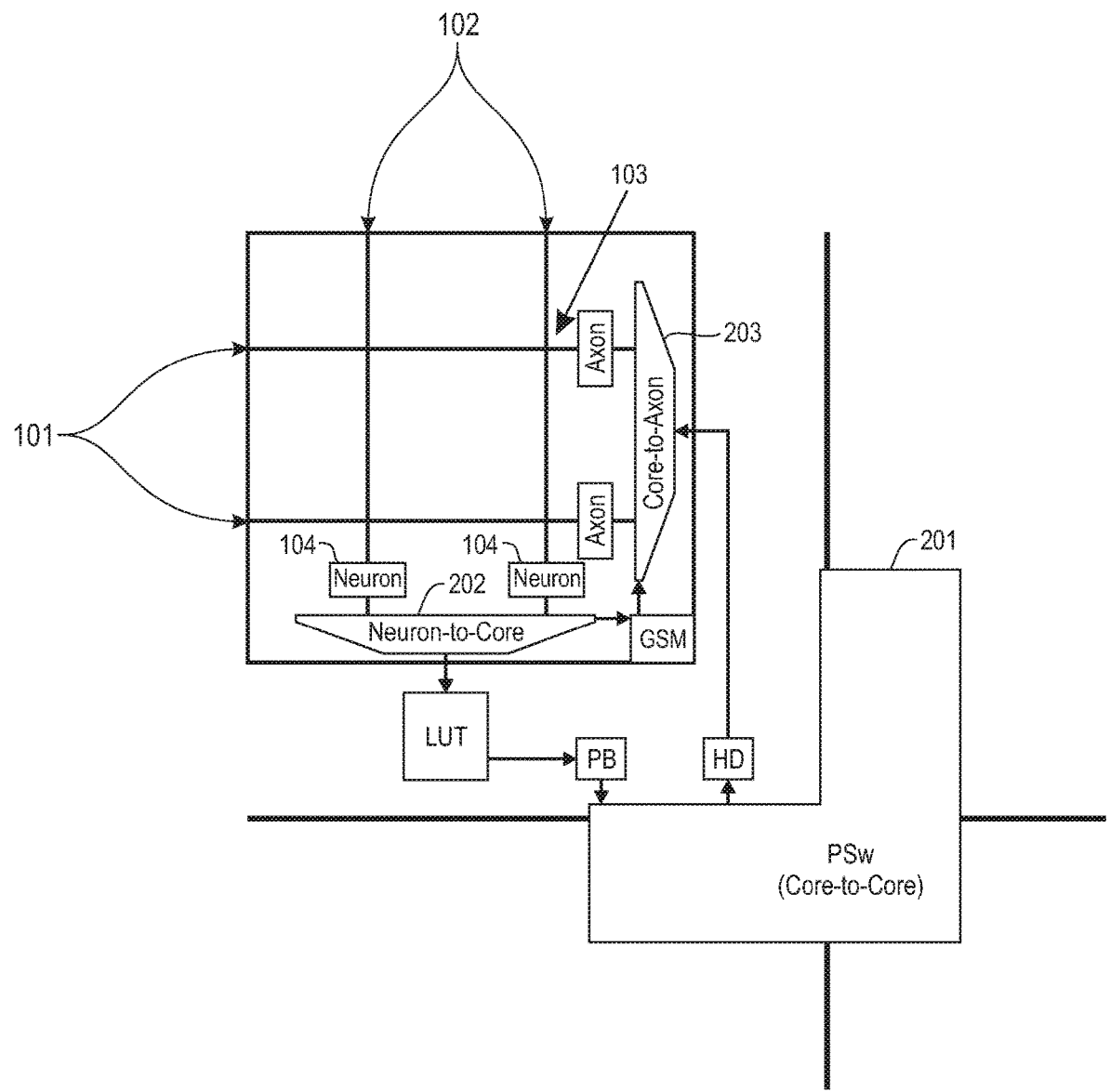
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core. Long-distance connectivity is logical. An exemplary embodiment is depicted in FIG. 2. Mesh router 201 provides communication between cores. Also on a given core, neuron to core 202 and core to axon 203 communication links are provided.

With reference now to FIGS. 3-18, various gating configurations according to embodiments of the present disclosure are illustrated. Although class numbers 1-16 are used herein for ease of reference, alternative numbers or names may be applied to the gating configurations described herein.

Figure 3:
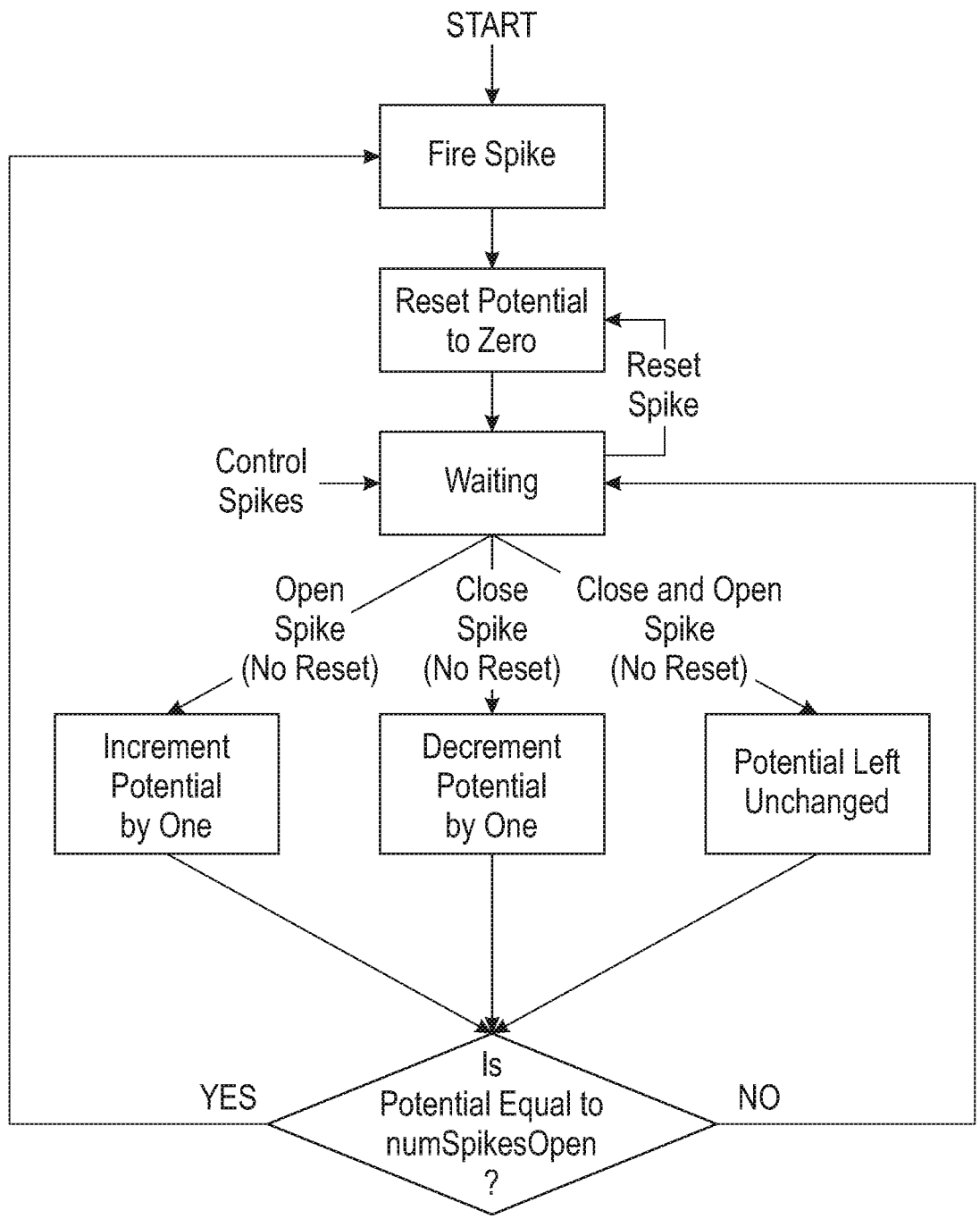
FIG. 3 is a state diagram of a first equivalence class according to embodiments of the present disclosure.

In FIG. 3, a first gate equivalence class according to embodiments of the present disclosure is illustrated. A class 1 gate includes Open and Close control axons, where a single spike is produced if the difference in the number of open and close control spikes is above a certain threshold. At tick 0 the gate is open (an output spike is generated).

The neuron can accept open spikes through an open axon and optionally also close spikes via a close axon. If numSpikesOpen more open spikes than close spikes have entered, then a single output spike is generated and the neuron resets to 0. Initially the neuron gate is set to open, which means that at tick 0 a spike is generated. The control axons can affect each neuron individually, or a single control axon can be used to control all neurons in a core. There is also a reset axon which re-initializes the potential to zero and can be used to reset the gate's state. For the sake of simplicity, the state diagram assumes that no control spikes enter during the first tick of the simulation.

In an exemplary implementation based on TrueNorth, Neuron Parameters include: S=[0 1 1 255]; sigma=[1 1 −1 −1]; alpha=numSpikesOpen; lmda=0; epsilon=0; sigma_1=−1; beta=127; kappa=0; gamma=0; sigmaVR=1; VR=0; and Vm=numSpikesOpen.

Figure 4:
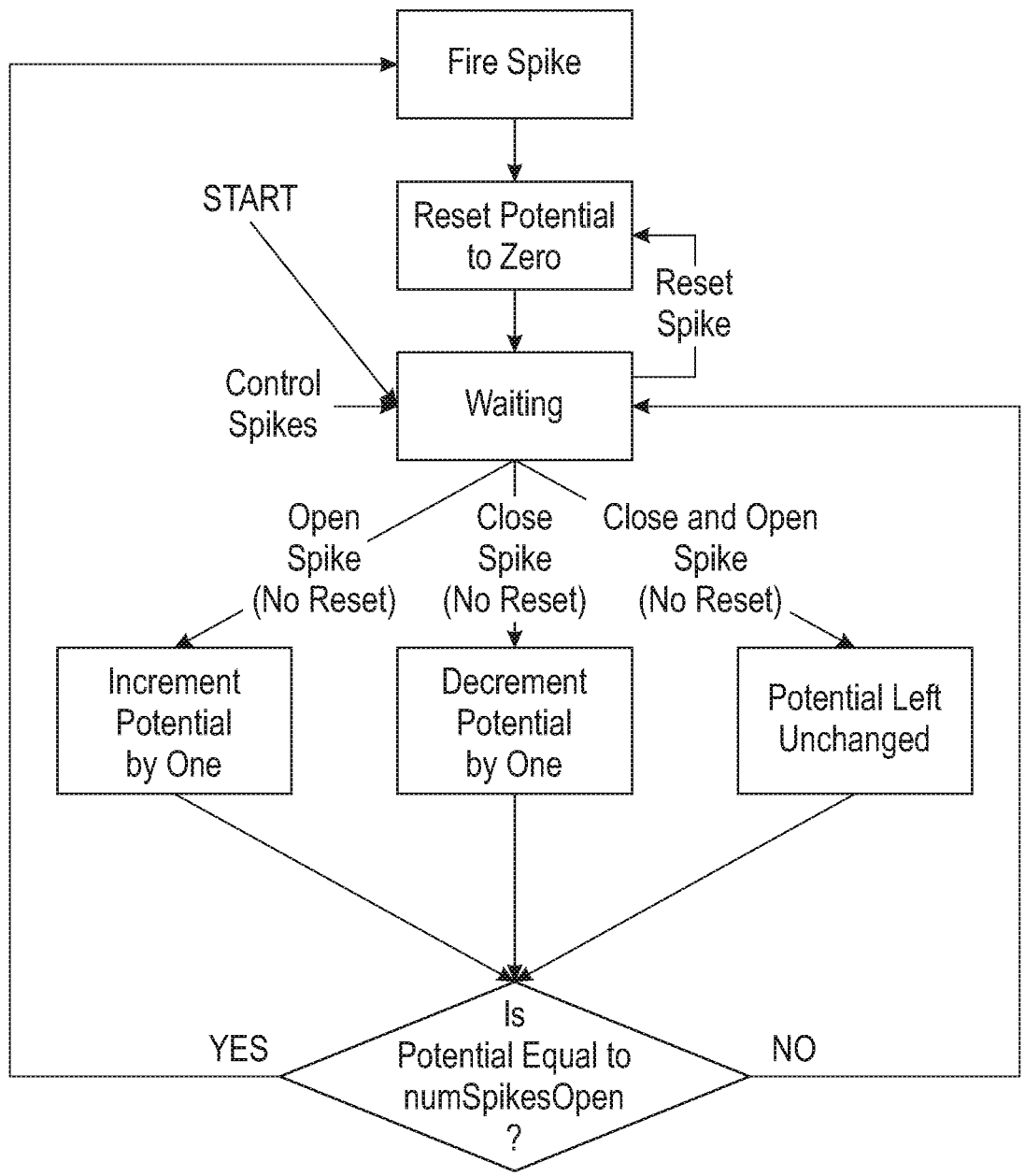
FIG. 4 is a state diagram of a second equivalence class according to embodiments of the present disclosure.

In FIG. 4, a second gate equivalence class according to embodiments of the present disclosure is illustrated. A class 2 gate is similar to class 1 except that at tick 0 the gate is closed (no spike is generated at tick 0).

In an exemplary implementation based on TrueNorth, Neuron Parameters include: S=[0 1 1 255]; sigma=[1 1 −1 −1]; alpha=numSpikesOpen; lmda=0; epsilon=0; sigma_1=−1; beta=127; kappa=0; gamma=0; sigmaVR=1; VR=0; Vm=0.

Figure 5:
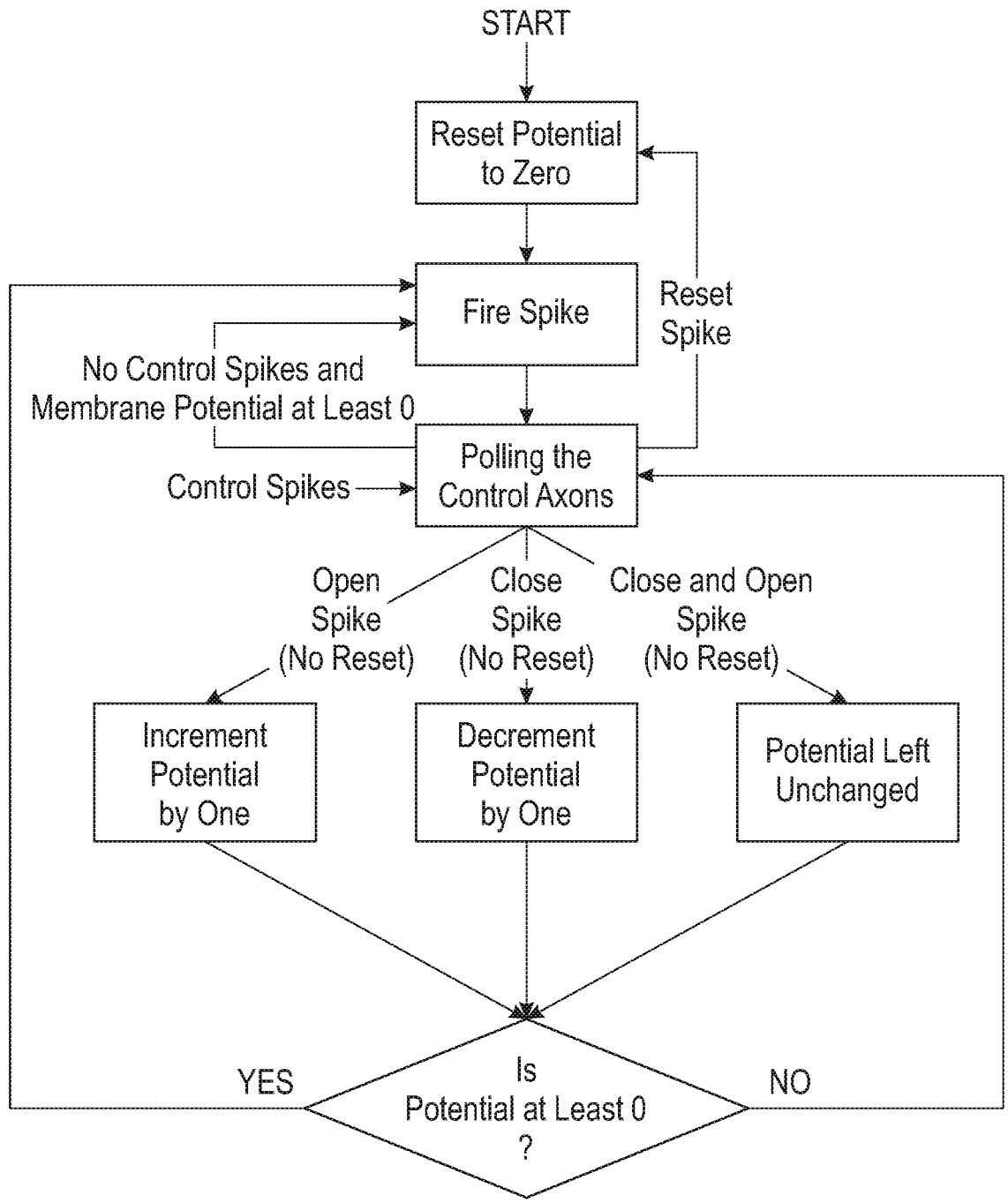
FIG. 5 is a state diagram of a third equivalence class according to embodiments of the present disclosure.

In FIG. 5, a third gate equivalence class according to embodiments of the present disclosure is illustrated. A class 3 gate fires spikes continuously as long as more Open controls are entered than Close controls between resets. Initially the neuron fires continuously.

This gate is similar to equivalence class 1 with numSpikesOpen=0. Another difference lies in the user interface defining the neuron, in that for this neuron the close axons are mandatory and the open axons are optional. The neuron begins the simulation by firing spikes continuously. If one or more close spikes enter, it stops firing spikes until an equal number of open spikes enter. Having an open spike axon is optional, and in its absence one can only reopen the gate after resetting it (which takes a single tick to reopen regardless of the number of close spikes preceding the last reset). Any extra open spikes than close spikes are ignored in the aggregate.

In an exemplary implementation based on TrueNorth, Neuron Parameters include: S=[0 1 1 255]; sigma=[1 1 −1 −1]; alpha=0; lmda=0; epsilon=0; sigma_1=−1; beta=127; kappa=0; gamma=0; sigmaVR=1; VR=0; Vm=0.

Figure 6:
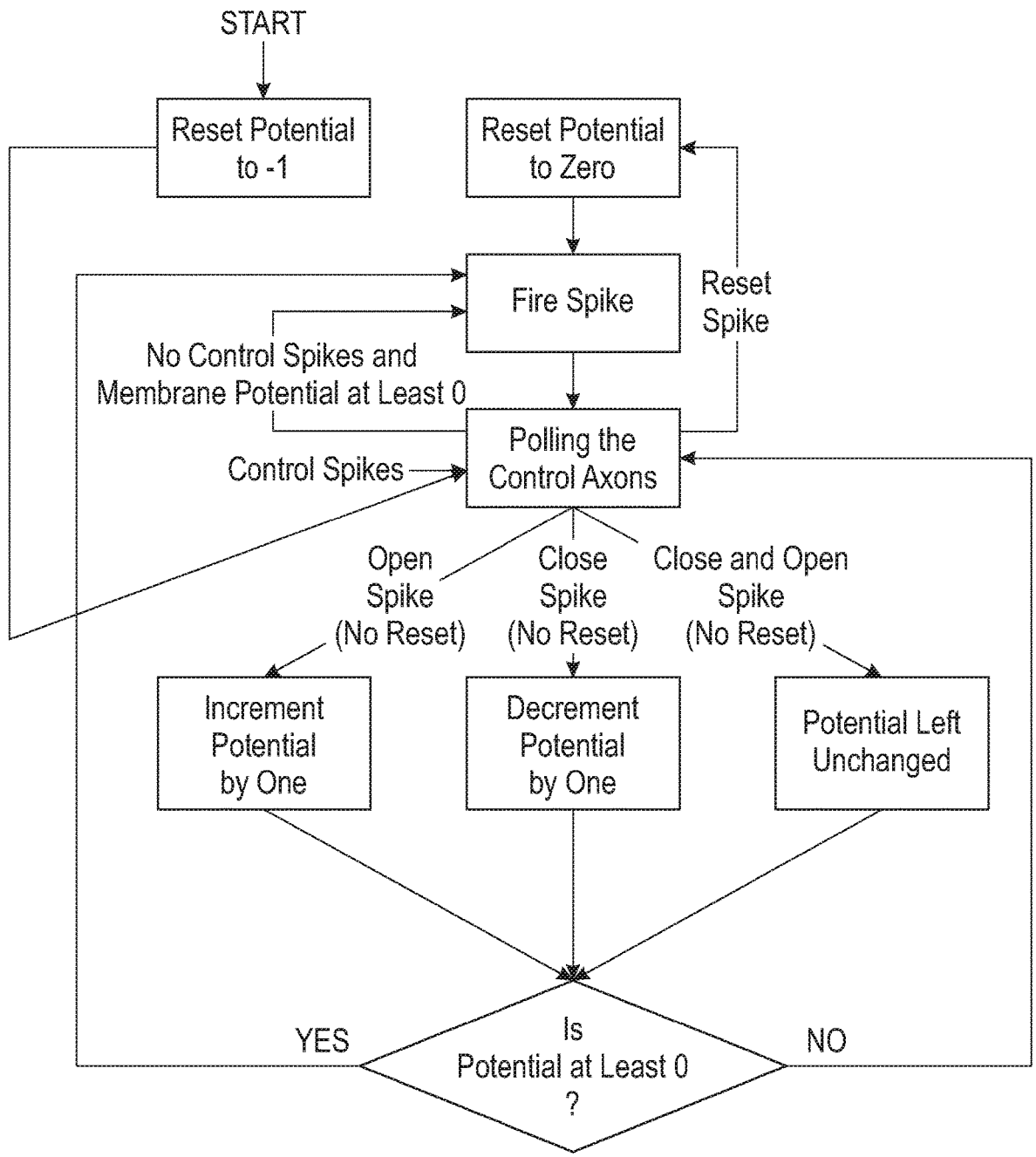
FIG. 6 is a state diagram of a fourth equivalence class according to embodiments of the present disclosure.

In FIG. 6, a fourth gate equivalence class according to embodiments of the present disclosure is illustrated. A class 4 gate is similar to class 3 except that at tick 0 the neuron does not fire (initially the gate is closed).

In an exemplary implementation based on TrueNorth, Neuron Parameters include: S=[0 1 1 255]; sigma=[1 1 −1 −1]; alpha=0; lmda=0; epsilon=0; sigma_1=−1; beta=127; kappa=0; gamma=0; sigmaVR=1; VR=0; Vm=−1.

Figure 7:
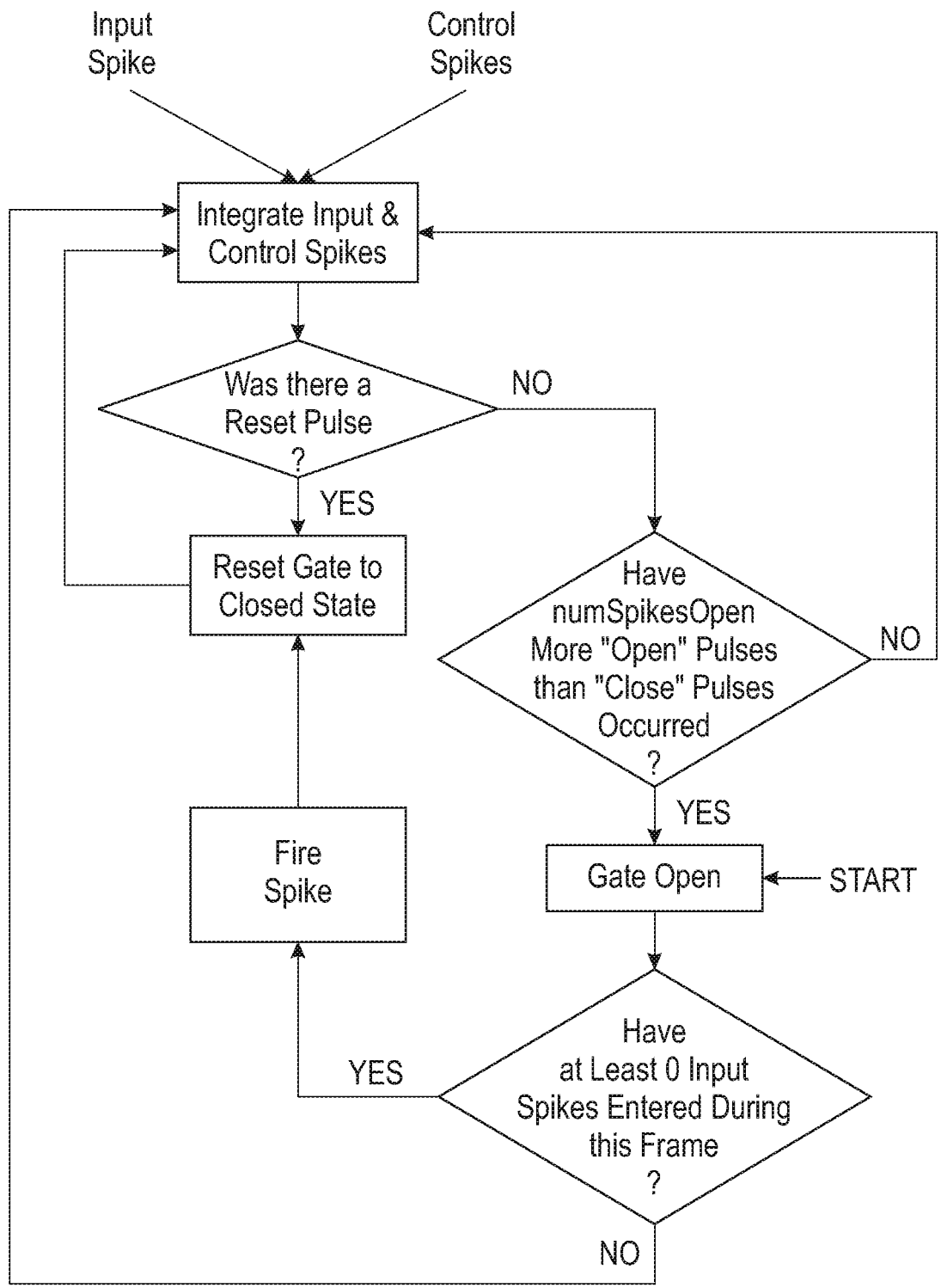
FIG. 7 is a state diagram of a fifth equivalence class according to embodiments of the present disclosure.

In FIG. 7, a fifth gate equivalence class according to embodiments of the present disclosure is illustrated. In a Class 5 gate, for each frame a single spike is fired if at least a certain number of user-specified input spikes have entered and the control axons have opened the gate.

This gate is useful for frame-based systems. The gate accepts a maximum of maxSpikesPerFrame spikes from its input axon during each frame period. If during that period numSpikesOpen more open control pulses are entered than close control pulses, then the gate examines whether the number of input spikes during the frame were at least θ, in which case a single spike is output. The close control axons are optional in the gate's user-interface. There is also a reset control axon which resets the gate to its closed state. Note that each close pulse effectively cancels an open pulse, so a close pulse is only effective if there were previous open pulses for this frame.

In an exemplary implementation based on TrueNorth, Neuron Parameters include: S=[1 maxSpikesPerFrame maxSpikesPerFrame 255]; sigma=[1 1 −1 −1]; alpha=numSpikesOpen*maxSpikesPerFrame+θ; lmda=0; epsilon=0; sigma_1=−1; beta=0; kappa=1; gamma=0; sigmaVR=1; VR=0; Vm=numSpikesOpen*maxSpikesPerFrame.

Figure 8:
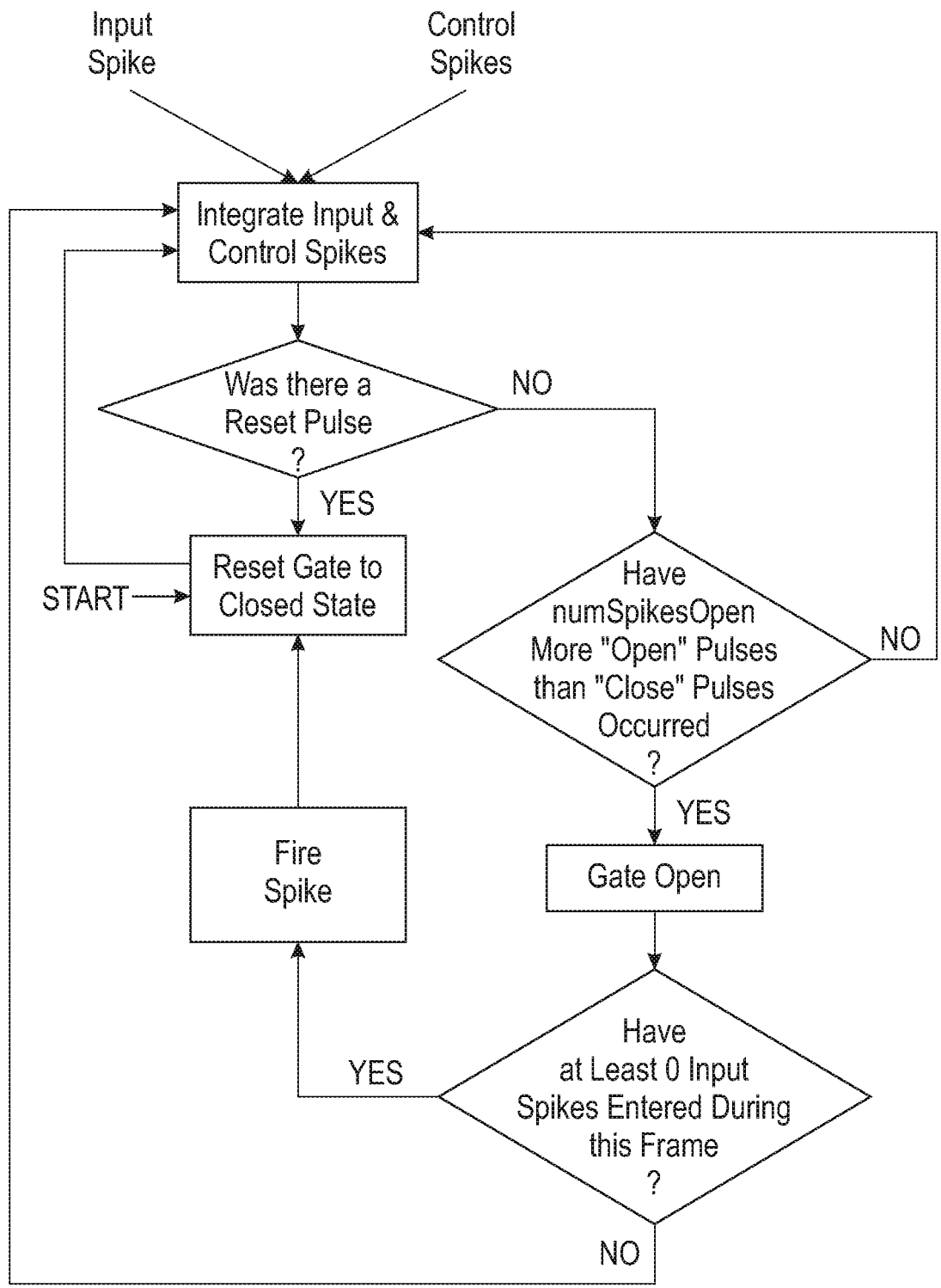
FIG. 8 is a state diagram of a sixth equivalence class according to embodiments of the present disclosure.

In FIG. 8, a sixth gate equivalence class according to embodiments of the present disclosure is illustrated. A Class 6 gate is similar to class 5 except that at tick 0 the gate is closed.

In an exemplary implementation based on TrueNorth, Neuron Parameters include: S=[1 maxSpikesPerFrame maxSpikesPerFrame 255]; sigma=[1 1 −1 −1]; alpha=numSpikesOpen*maxSpikesPerFrame+θ; lmda=0; epsilon=0; sigma_1=−1; beta=0; kappa=1; gamma=0; sigmaVR=1; VR=0; Vm=0.

Figure 9:
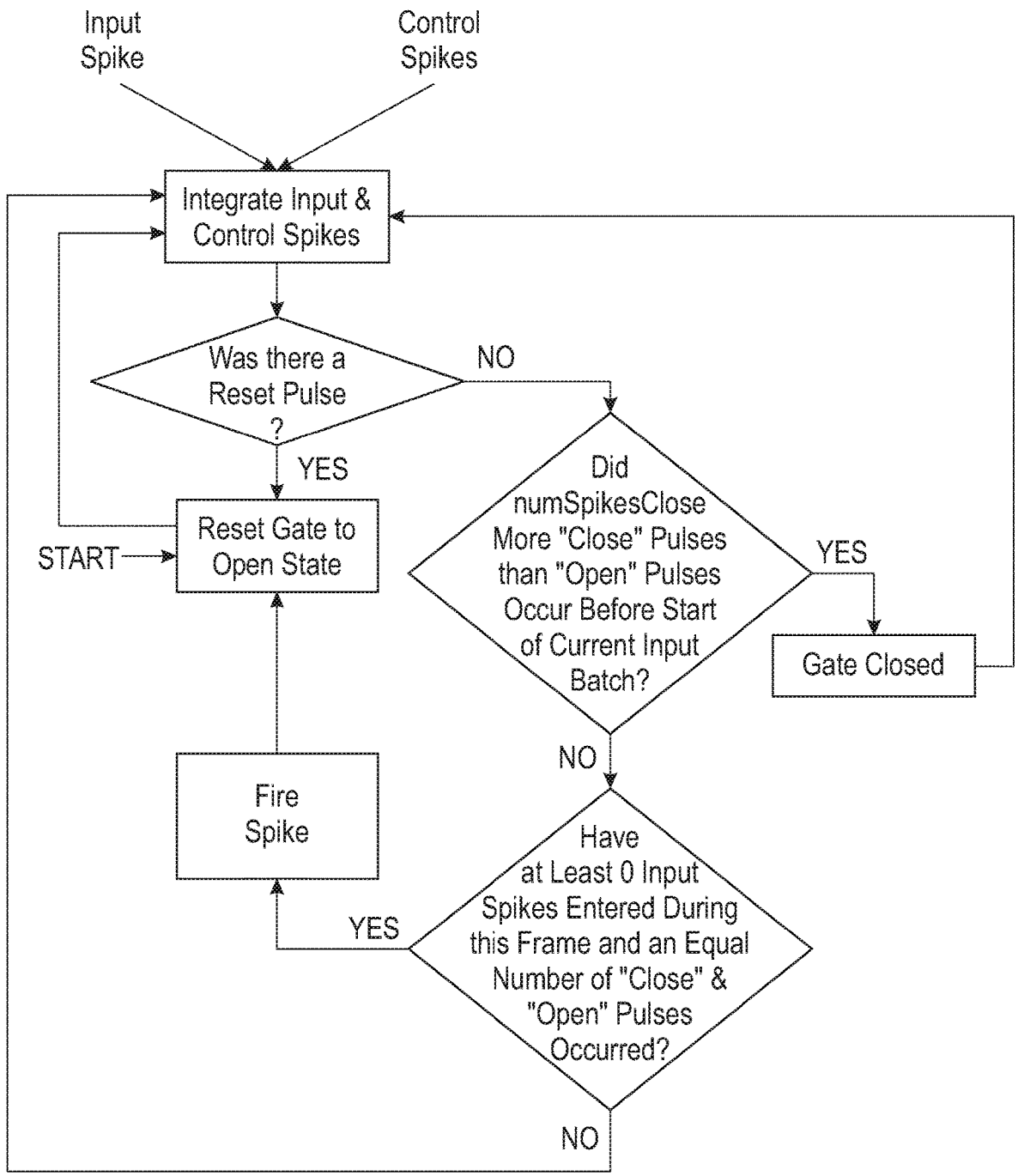
FIG. 9 is a state diagram of a seventh equivalence class according to embodiments of the present disclosure.

In FIG. 9, a seventh gate equivalence class according to embodiments of the present disclosure is illustrated. A Class 7 gate is similar to class 5 except that at the start of each frame the gate is open, so we can only close the gate per frame.

This gate is useful for frame-based systems. For this gate, the close control axons are mandatory, and the open control axons are optional. During each frame a maximum of maxSpikesPerFrame spikes can enter via the gate's input axon(s). If numSpikesClose more close pulses than open pulses are sent before any input then the gate is guaranteed closed for numSpikesClose frames before flooding (flooding refers to unpredictable behavior which can occur if the gate is not reset every numSpikesClose frames). Upon reset the gate is open. If the gate is not set to a closed state at the start of each batch, then it fires a single spike as soon as at least θ input spikes enter. A difference compared to classes 5-6 is that class 7 enables the user to close the gate at will at the beginning of each batch of numSpikesClose frames (with the potential exception of the first frame, by default the gate is open at the start of each batch), while classes 5-6 enable the user to open the gate since by default the gate is closed (again with the potential exception of the first frame). For control pulses that enter during the input spike period, the behavior is undefined. By default at the start the gate is open.

In an exemplary implementation based on TrueNorth, Neuron Parameters include: S=[1 maxSpikesPerFrame maxSpikesPerFrame 255]; sigma=[1 1 −1 −1]; alpha=θ; lmda=0; epsilon=0; sigma_1=−1; beta=numSpikesClose*maxSpikesPerFrame; kappa=0; gamma=0; sigmaVR=1; VR=0; Vm=0.

Figure 10:
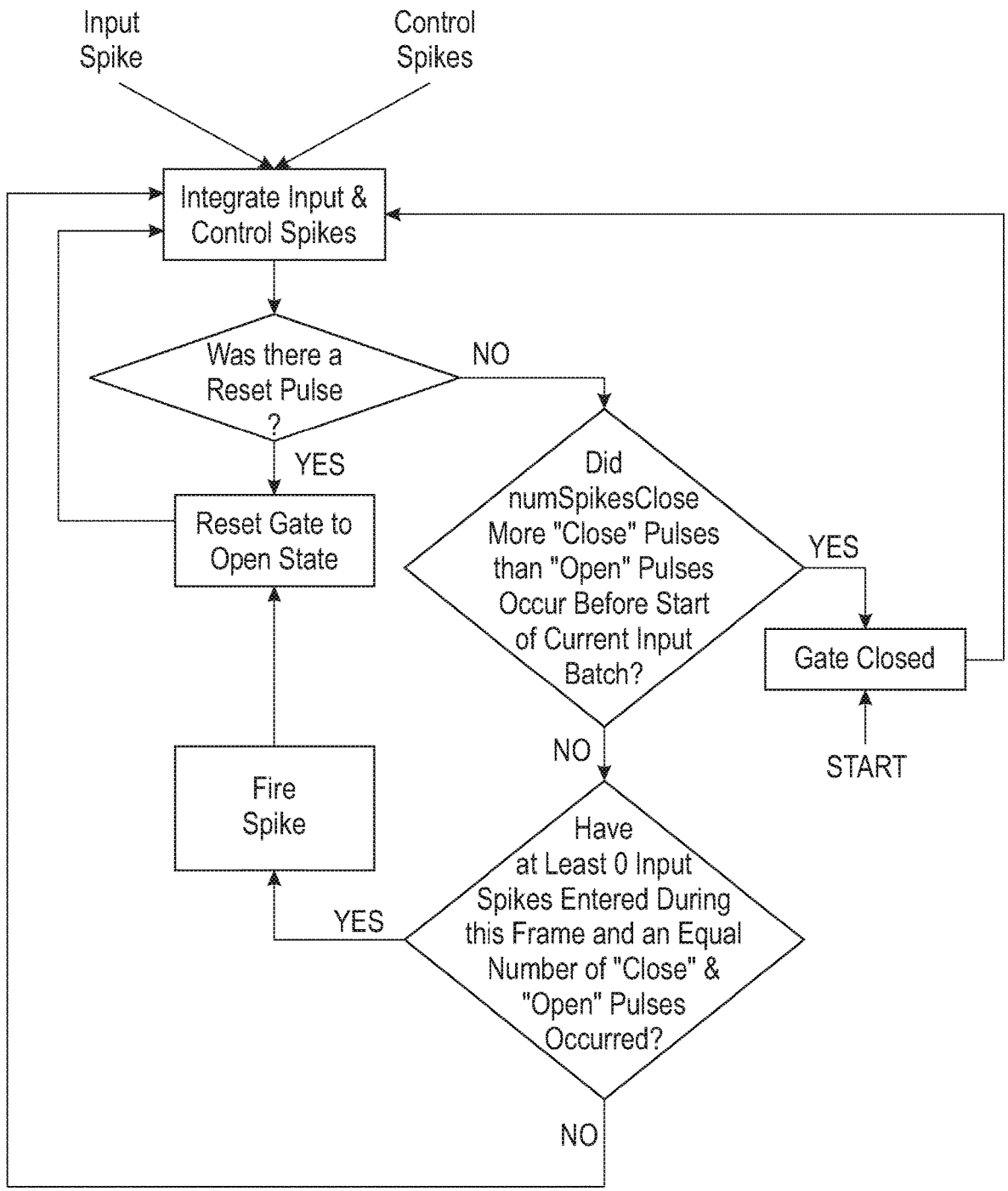
FIG. 10 is a state diagram of an eighth equivalence class according to embodiments of the present disclosure.

In FIG. 10, an eighth gate equivalence class according to embodiments of the present disclosure is illustrated. A Class 8 gate is similar to class 7 except that initially the gate is closed.

In an exemplary implementation based on TrueNorth, Neuron Parameters include: S=[1 maxSpikesPerFrame maxSpikesPerFrame 255]; sigma=[1 1 −1 −1]; alpha=0; lmda=0; epsilon=0; sigma_1=−1; beta=numSpikesClose*maxSpikesPerFrame; kappa=0; gamma=0; sigmaVR=1; VR=0; Vm=−numSpikesClose*maxSpikesPerFrame.

Figure 11:
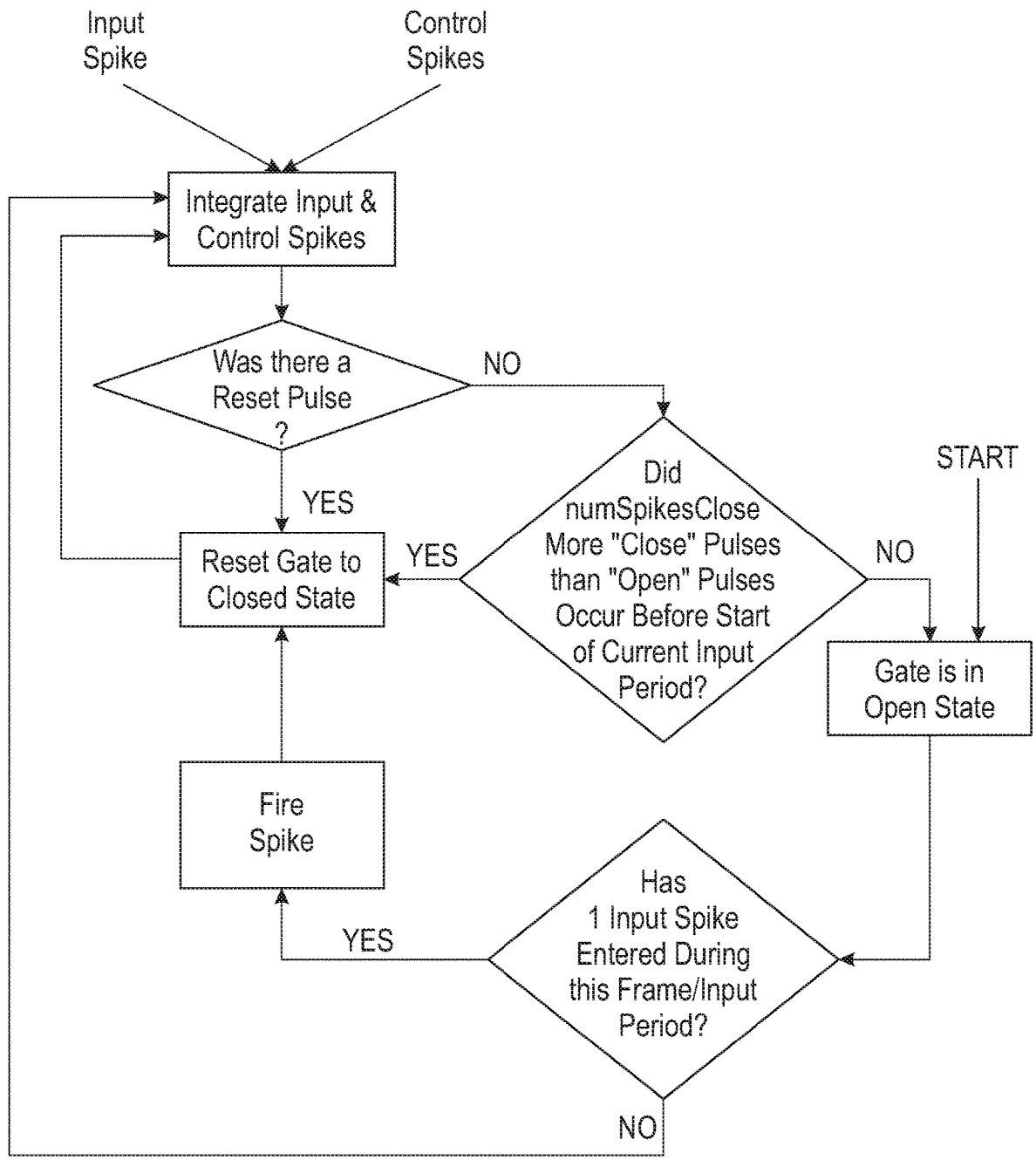
FIG. 11 is a state diagram of a ninth equivalence class according to embodiments of the present disclosure.

In FIG. 11, an ninth gate equivalence class according to embodiments of the present disclosure is illustrated. A Class 9 gate accepts binary inputs between frames (at most one spike per frame per gate) and does not let that spike go through if the number of Close control spikes exceeds the Open control spikes by a certain threshold.

This gate assumes binary inputs (at most one input spike per gate between every pair of resets). The gate will output a single spike on a single input spike if and only if we have not sent numSpikesClose more close spikes than open spikes before the input arrives. For example, if numSpikesClose−1 close spikes have been sent and no open spikes, then on an input spike the gate will still produce an output spike. There is also a reset spike which resets the gate to its closed state (if there are no control spikes in the next frame period, the gate automatically opens). If open control axons are used, we assume that between resets the number of open pulses is never more than the number of close pulses.

In an exemplary implementation based on TrueNorth, Neuron Parameters include: S=[numSpikesClose 1 1 255]; sigma=[1 1 −1 −1]; alpha=1; lmda=0; epsilon=0; sigma_1=−1; beta=numSpikesClose; kappa=0; gamma=0; sigmaVR=1; VR=0; Vm=0.

Figure 12:
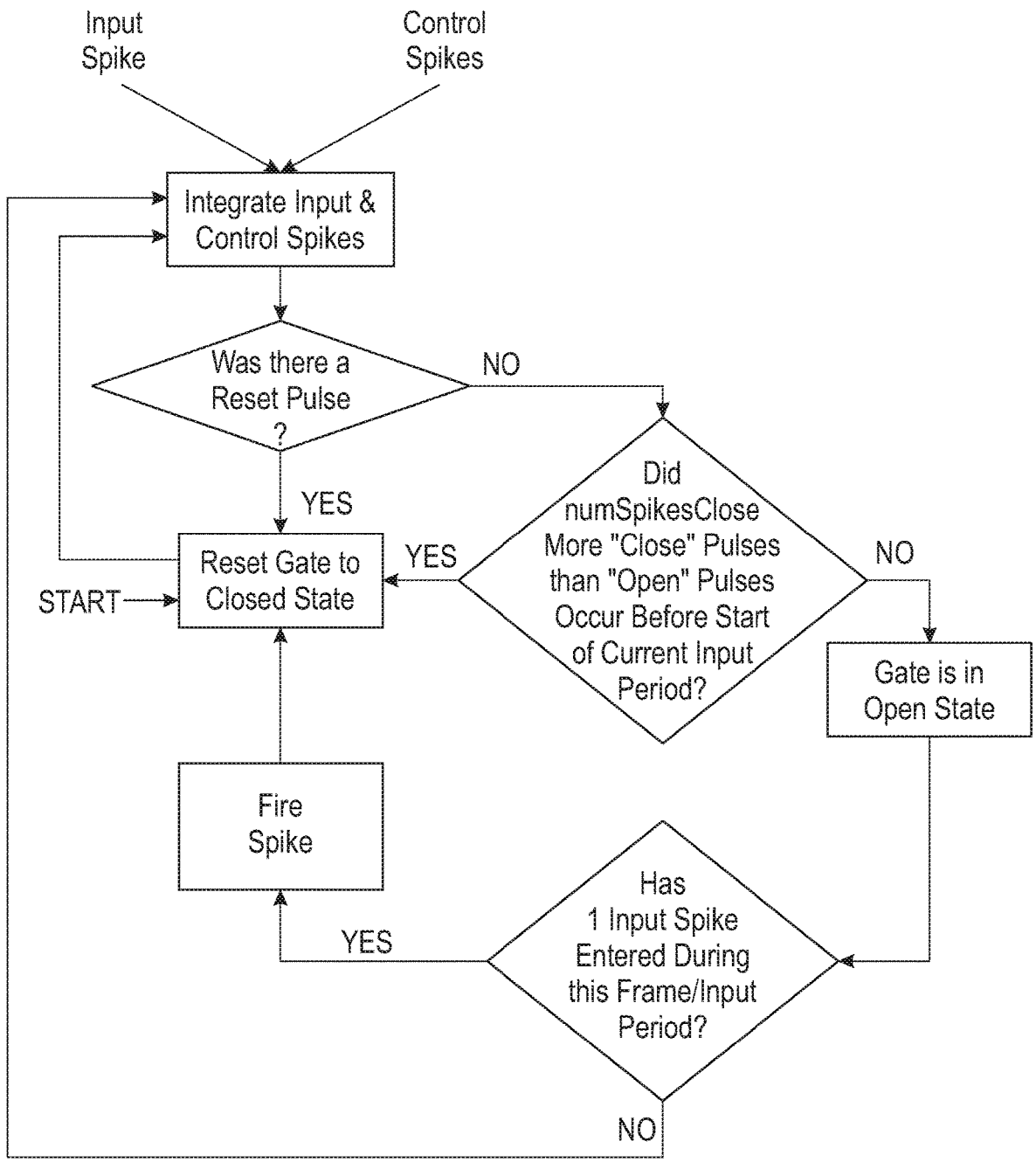
FIG. 12 is a state diagram of a tenth equivalence class according to embodiments of the present disclosure.

In FIG. 12, a tenth gate equivalence class according to embodiments of the present disclosure is illustrated. A Class 10 gate is similar to class 9 except that initially the gate is closed.

In an exemplary implementation based on TrueNorth, Neuron Parameters include: S=[numSpikesClose 1 1 255]; sigma=[1 1 −1 −1]; alpha=1; lmda=0; epsilon=0; sigma_1=−1; beta=numSpikesClose; kappa=0; gamma=0; sigmaVR=1; VR=0; Vm=−numSpikesClose.

Figure 13:
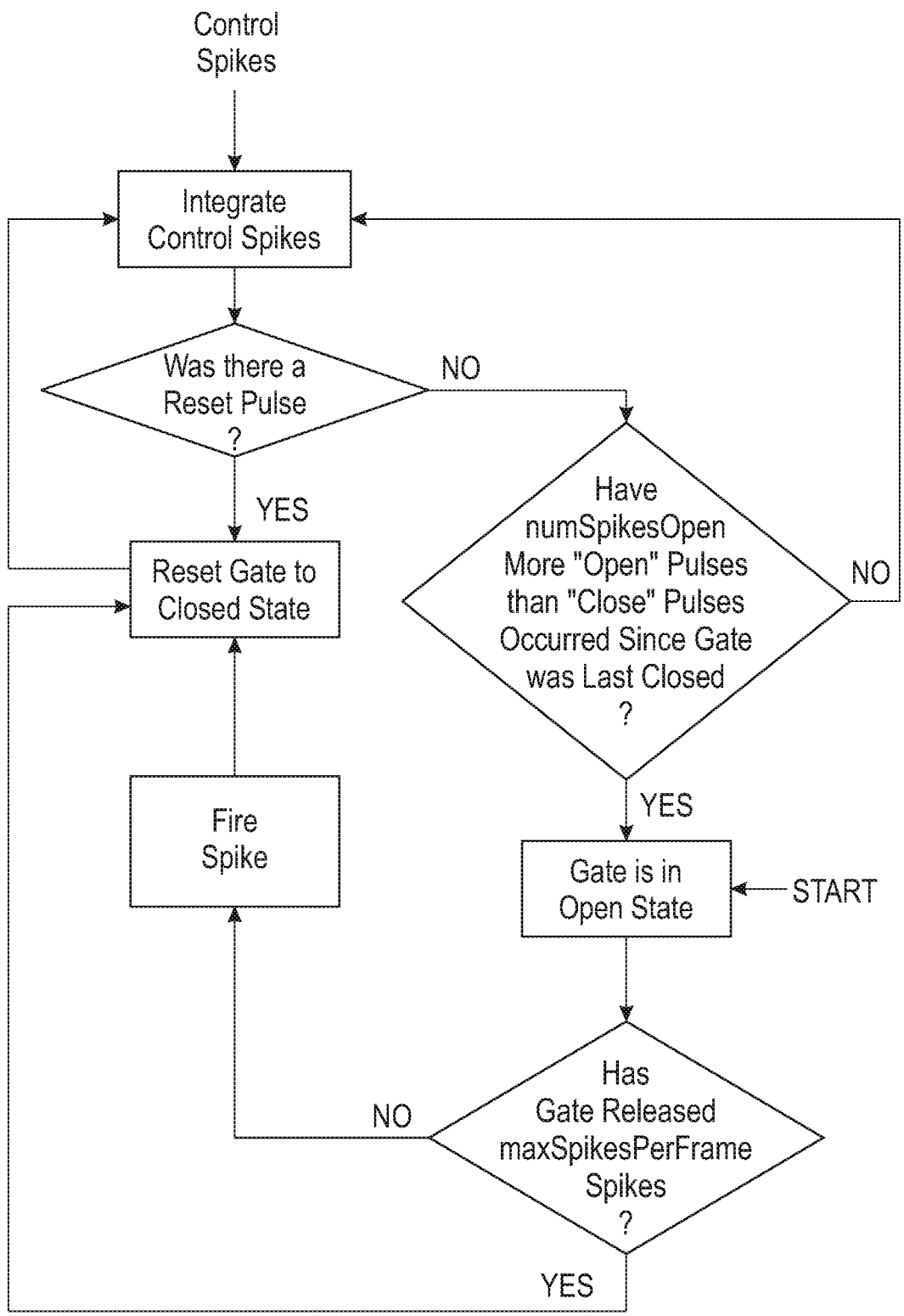
FIG. 13 is a state diagram of an eleventh equivalence class according to embodiments of the present disclosure.

In FIG. 13, an eleventh gate equivalence class according to embodiments of the present disclosure is illustrated. A Class 11 gate produces a burst code, whose length is specified by the user, if the number of open pulses exceeds the close pulses by a certain threshold.

This gate produces maxSpikesPerFrame spikes in a row if numSpikesOpen more open pulses than close pulses occur between two resets. Note that this gate does not accept input spikes, just control spikes. The open control axon is mandatory and the close axon is optional. A reset pulse sets the gate to its closed state.

In an exemplary implementation based on TrueNorth, Neuron Parameters include: S=[0 maxSpikesPerFrame maxSpikesPerFrame 255]; sigma=[1 1 −1 −1]; alpha=1; lmda=0; epsilon=0; sigma_1=−1; beta=(numSpikesOpen−1)*maxSpikesPerFrame; kappa=1; gamma=1; sigmaVR=1; VR=0; Vm=maxSpikesPerFrame.

Figure 14:
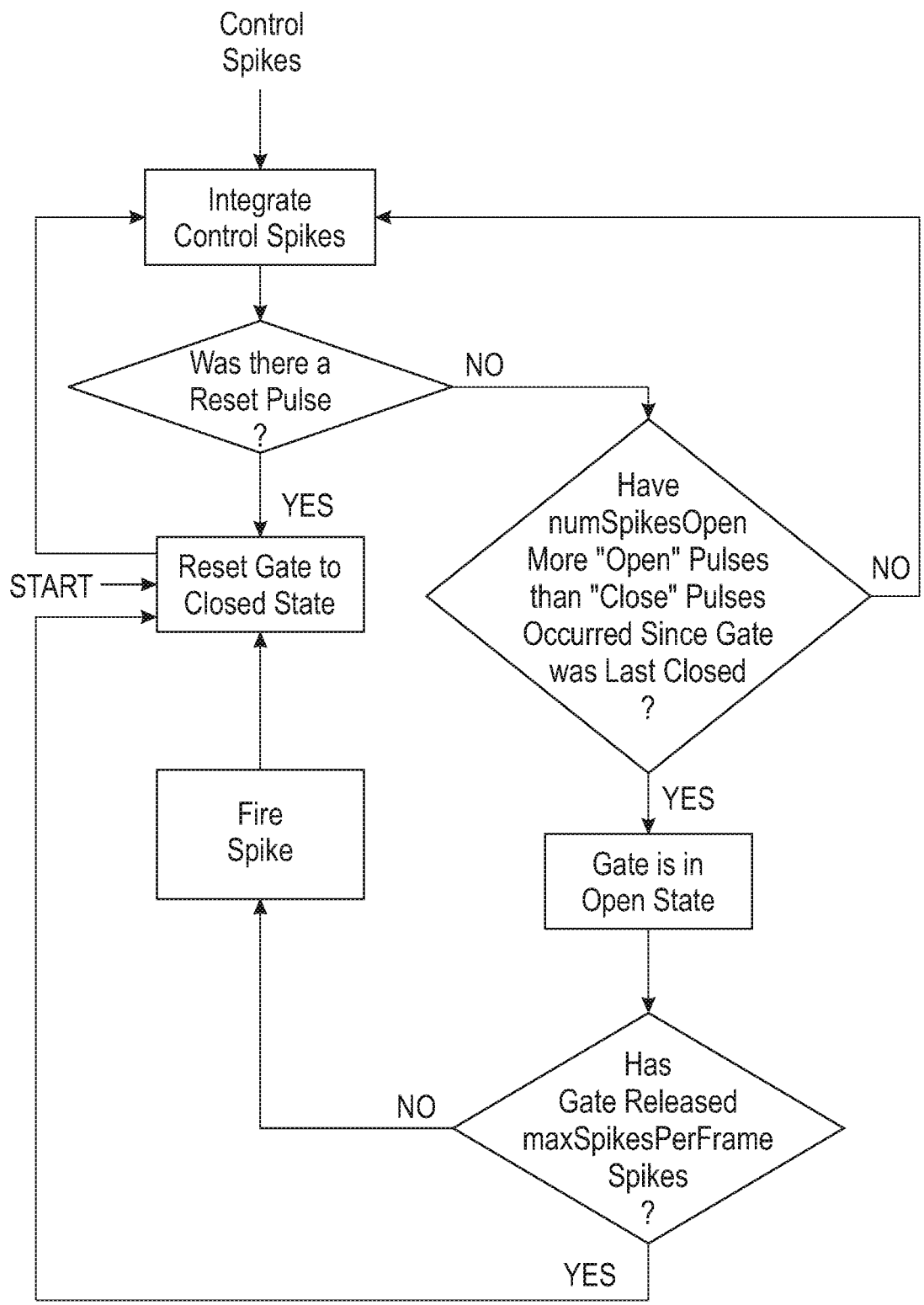
FIG. 14 is a state diagram of a twelfth equivalence class according to embodiments of the present disclosure.

In FIG. 14, an twelfth gate equivalence class according to embodiments of the present disclosure is illustrated. A Class 12 is similar to class 11 except that initially the gate is closed.

In an exemplary implementation based on TrueNorth, Neuron Parameters include: S=[0 maxSpikesPerFrame maxSpikesPerFrame 255]; sigma=[1 1 −1 −1]; alpha=1; lmda=0; epsilon=0; sigma_1=−1; beta=(numSpikesOpen−1)*maxSpikesPerFrame; kappa=1; gamma=1; sigmaVR=1; VR=0; Vm=−(numSpikesOpen−1)*maxSpikesPerFrame.

Figure 15:
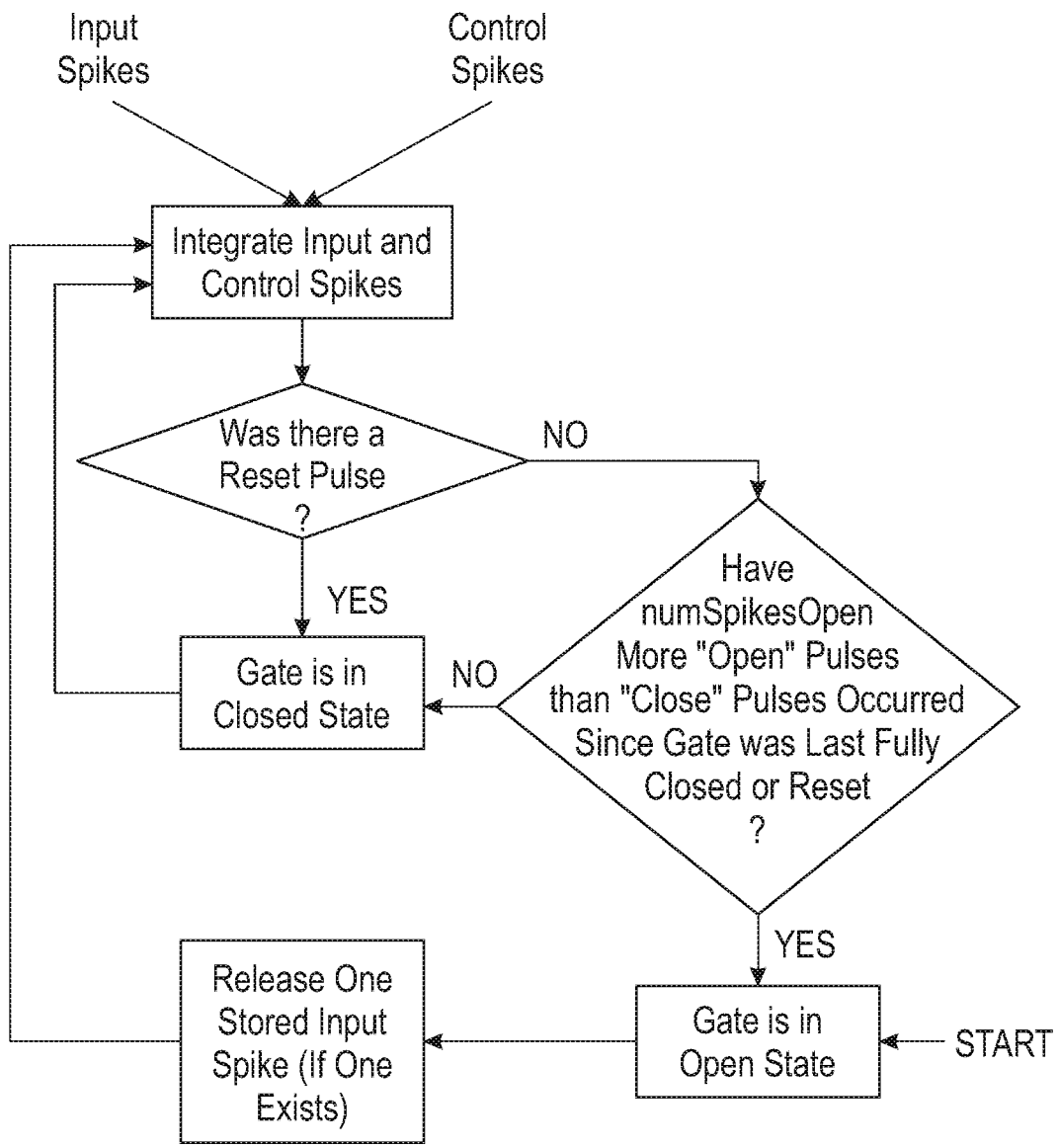
FIG. 15 is a state diagram of a thirteenth equivalence class according to embodiments of the present disclosure.

In FIG. 15, an thirteenth gate equivalence class according to embodiments of the present disclosure is illustrated. A Class 13 gate starts releasing the gated/stored input spikes, until the gate is fully closed, thus enabling the release of only part of the stored information. The gate can be closed and opened multiple times between frames.

This gate is meant to accept at most maxSpikesPerFrame input spikes between every pair of reset spikes. It also uses open control spikes, and optional close spikes. If numSpikesOpen more open spikes are received than close spikes, then the gate becomes open and it lets through any input spikes entered since the last reset and until the next reset. Note that at any time, the number of close spikes must be at most equal to the number of open spikes that have occurred since the last reset. Upon reset the gate is set to its closed state. However for the first frame the gate is set to the open state. It is also possible to re-close the gate without a reset, by using at most numSpikesOpen close pulses, in which case the same number of open pulses are needed to reopen the gate. So the number of close and open can be thought of as encoding how fully the gate is closed.

In an exemplary implementation based on TrueNorth, Neuron Parameters include: S=[1 maxSpikesPerFrame maxSpikesPerFrame 255]; sigma=[1 1 −1 −1]; alpha=1; lmda=0; epsilon=0; sigma_1=−1; beta=numSpikesOpen*maxSpikesPerFrame; kappa=1; gamma=1; sigmaVR=1; VR=0; Vm=0.

Figure 16:
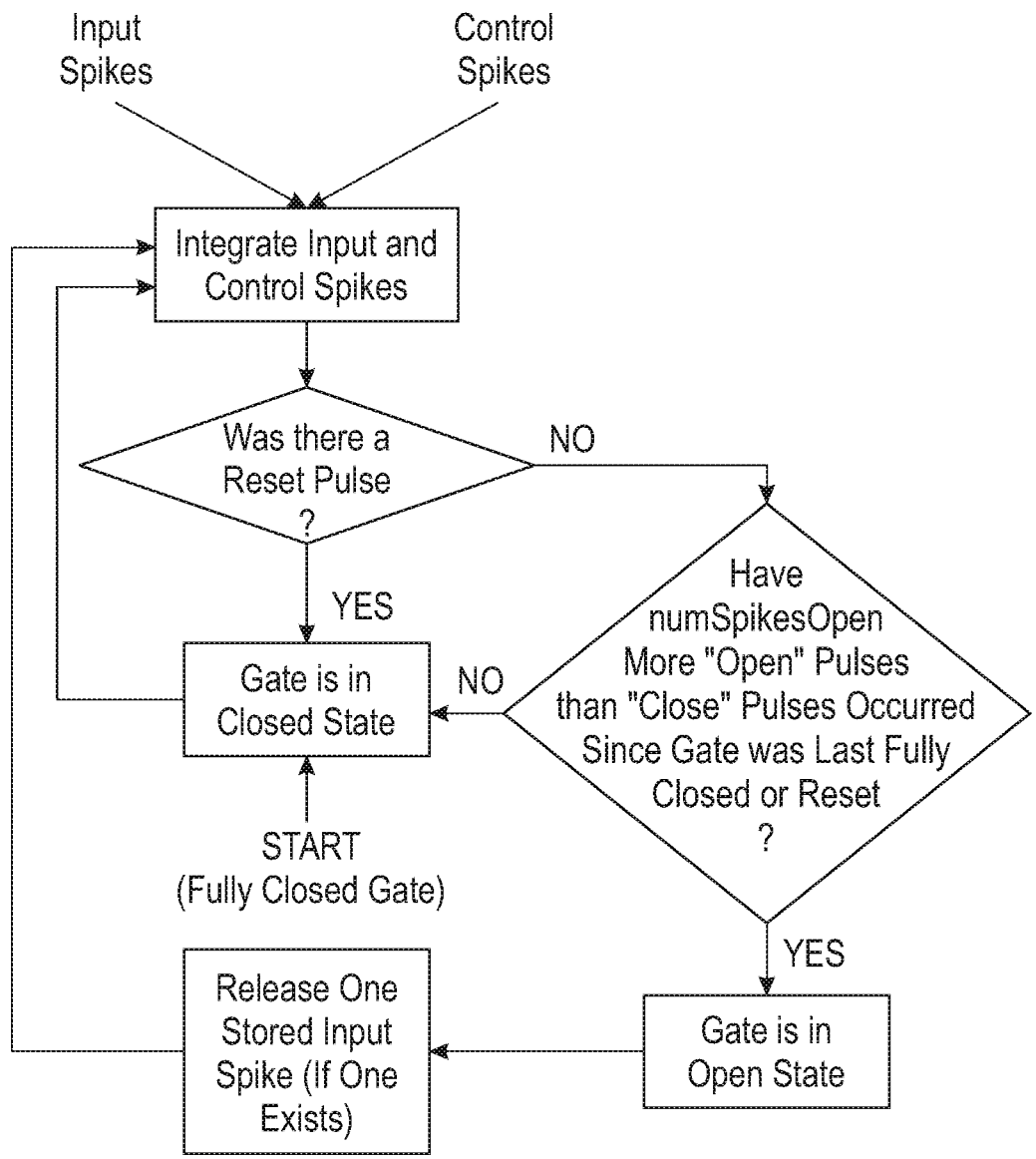
FIG. 16 is a state diagram of a fourteenth equivalence class according to embodiments of the present disclosure.

In FIG. 16, a fourteenth gate equivalence class according to embodiments of the present disclosure is illustrated. A Class 14 gate is similar to class 13 except that initially the gate is fully closed.

In an exemplary implementation based on TrueNorth, Neuron Parameters include: S=[1 maxSpikesPerFrame maxSpikesPerFrame 255]; sigma=[1 1 −1 −1]; alpha=1; lmda=0; epsilon=0; sigma_1=−1; beta=numSpikesOpen*maxSpikesPerFrame; kappa=1; gamma=1; sigmaVR=1; VR=0; Vm=−numSpikesOpen*maxSpikesPerFrame.

Figure 17:
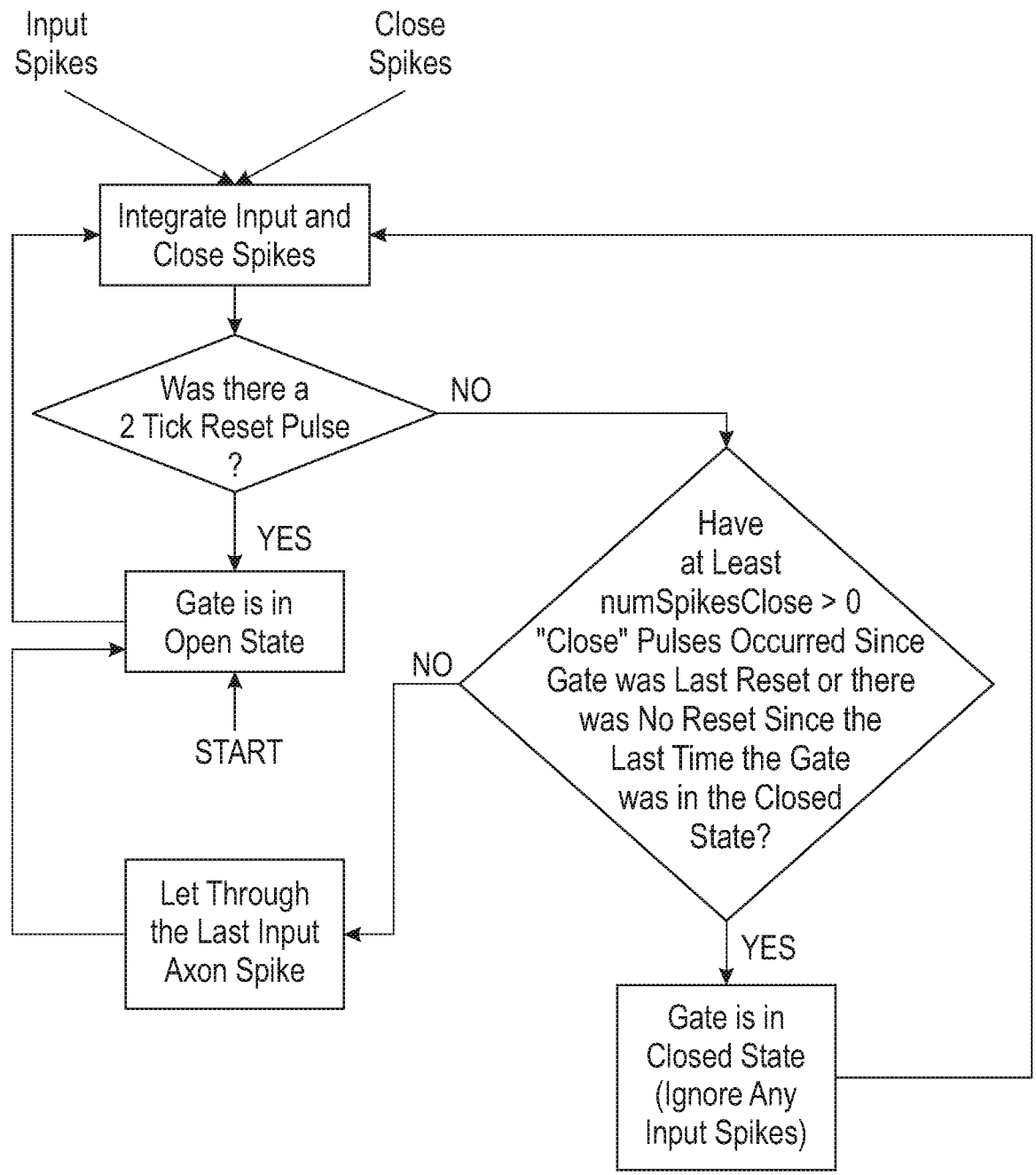
FIG. 17 is a state diagram of a fifteenth equivalence class according to embodiments of the present disclosure.

In FIG. 17, a fifteenth gate equivalence class according to embodiments of the present disclosure is illustrated. A Class 15 gate can selectively close neurons in a core so that no information passes through them for multiple frames (not just a single frame).

Assuming a frame-based system with a maximum of maxSpikesPerFrame input spikes per frame, the gate only accepts close control spikes and reset control spikes (no open control spikes). If numSpikeClose close spikes occur before any input arrives since the last reset, then the gate is guaranteed closed for numSpikesClose frames (does not permit any input spikes through). On reset the gate is open (lets through any inputs). The globalCtrlClose option can be used to gate/close all neurons in a core simultaneously, while the local control axon can be used to control each gate individually (it is possible to include all axon types simultaneously in the user interface). This is particularly important if we want to implement an inhibition of return like mechanism for example. By default the gate is open during the first frame. The reset takes place within two ticks. The first reset pulse first sets the neuron to its fully closed state and the second reset pulse increases the potential by +254 setting the gate to its open state. If a 1 tick reset is needed and you can assume a maximum of 1 spike (binary) input, then one of the previously described gates is better.

In an exemplary implementation based on TrueNorth, Neuron Parameters include: S=[1 254 maxSpikesPerFrame 255]; sigma=[1 1 −1 −1]; alpha=1; lmda=0; epsilon=0; sigma_1=−1; beta=254; kappa=1; gamma=1; sigmaVR=1; VR=0; Vm=0.

Figure 18:
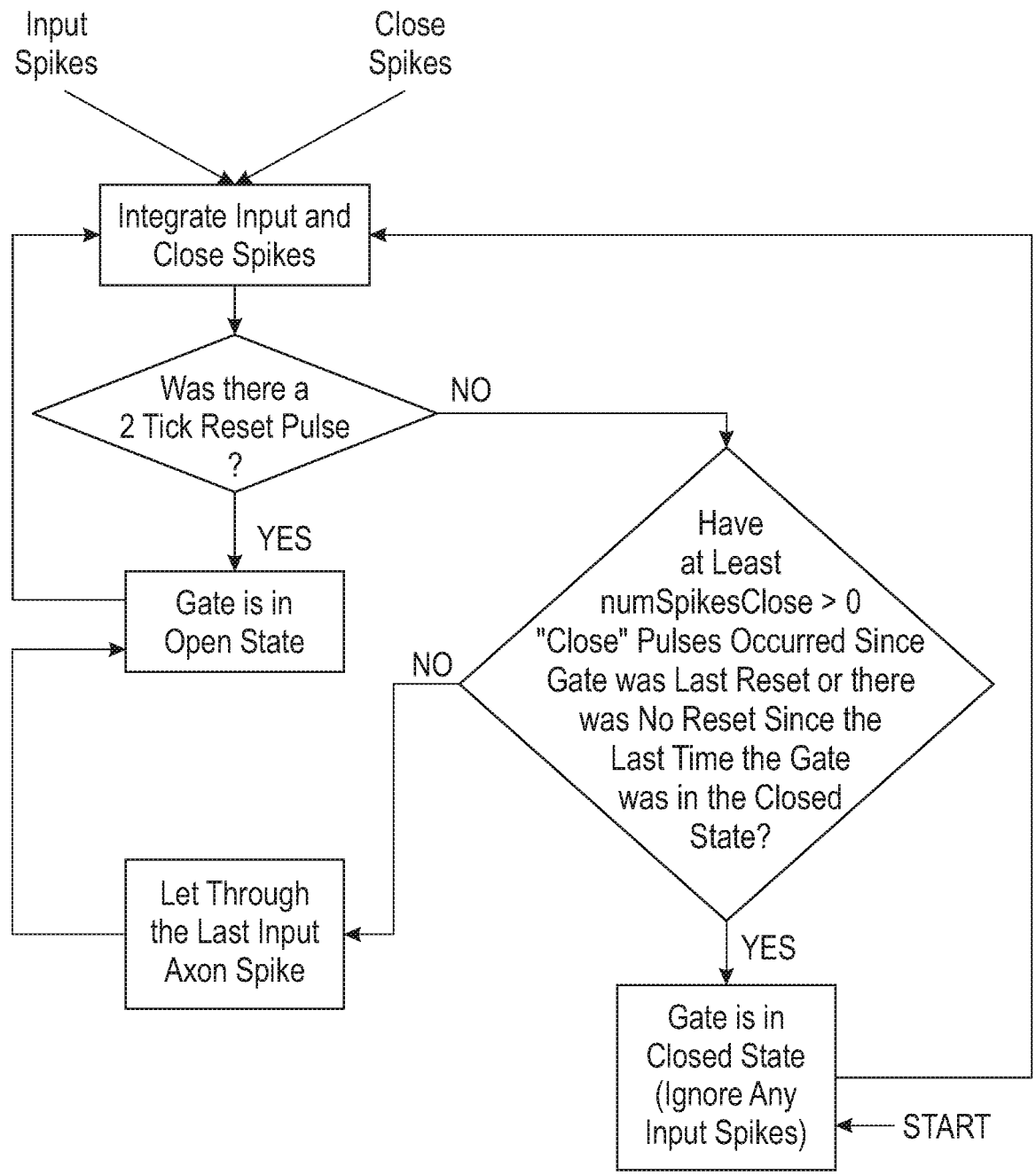
FIG. 18 is a state diagram of a sixteenth equivalence class according to embodiments of the present disclosure.

In FIG. 18, a sixteenth gate equivalence class according to embodiments of the present disclosure is illustrated. A Class 16 gate is similar to class 15 except that initially the gate is fully closed.

In an exemplary implementation based on TrueNorth, Neuron Parameters include: S=[1 254 maxSpikesPerFrame 255]; sigma=[1 1 −1 −1]; alpha=1; lmda=0; epsilon=0; sigma_1=−1; beta=254; kappa=1; gamma=1; sigmaVR=1; VR=0; Vm=−254.

Gating neurons form a useful building block for neuromorphic systems. Accordingly, the present disclosure provides a family of gating neurons useful in a variety of neurosynaptic system. Such gating mechanisms are useful in selective attention, for filtering out unnecessary information.

Figure 19:
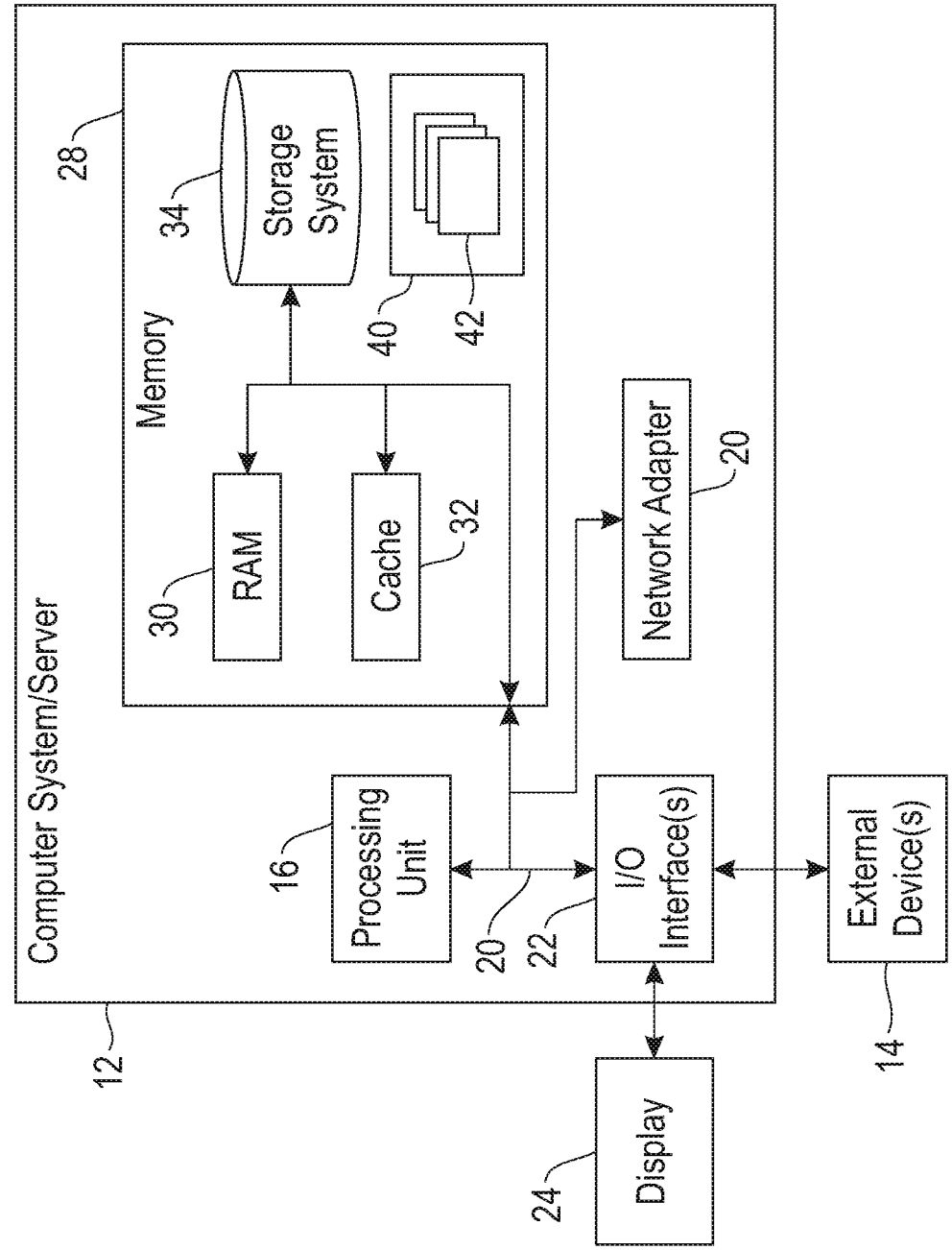
FIG. 19 depicts a computing node according to an embodiment of the present invention.

Referring now to FIG. 19, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a neurosynaptic core, the neurosynaptic core comprising a plurality of neurons and axons, wherein
the neurosynaptic core comprises a programmable gate operative to receive a control signal and selectively output a first output signal based on the control signal, the control signal comprising open and close control spikes, the programmable gate configured to count the open and close spikes and to output the first output signal only when a difference between the count of open and close control spikes exceeds a predetermined threshold;
the neurosynaptic core is operative to receive a first input signal, and wherein the first output signal comprises the first input signal,
the first input signal comprises a plurality of spikes, and the first input signal is rate coded.

2. The system of claim 1, wherein the programmable gate outputs the first output signal in the absence of the control signal.

3. The system of claim 1, wherein the control signal is shared with a second programmable gate.

4. The system of claim 1, wherein selectively outputting the first output comprises evaluating the control signal against a predetermined threshold.

5. The system of claim 1, comprising:
a working memory operatively coupled to the neurosynaptic core, the working memory comprising a plurality of subsets, wherein
the programmable gate is operative to selectively output one of the plurality of sub sets.

6. The system of claim 1, wherein the neurosynaptic core is configured according to one or more configuration parameters selected from: an input encoding type; an indication of whether a first input signal is received; an indication of whether the control signal is shared with additional programmable gates; an indication of whether the programmable gate outputs the first output signal in the absence of a control signal; and an indication of whether the control signal is evaluated against a predetermined threshold.

7. A method comprising:
reading a plurality of input parameters defining the behavior of a programmable gate;
based upon the plurality of input parameters, configuring a neurosynaptic core to provide the programmable gate, operative to receive a control signal and selectively output a first output signal based on the control signal, the control signal comprising open and close control spikes, the programmable gate configured to count the open and close spikes and to output the first output signal only when a difference between the count of open and close control spikes exceeds a predetermined threshold, wherein
the neurosynaptic core is operative to receive a first input signal, and wherein
the first output signal comprises the first input signal, the first input signal comprises a plurality of spikes, and the first input signal is rate coded.

8. The method of claim 7, wherein the programmable gate outputs the first output signal in the absence of the control signal.

9. The method of claim 7, wherein the control signal is shared with a second programmable gate.

10. The method of claim 7, wherein selectively outputting the first output comprises evaluating the control signal against a predetermined threshold.

11. The method of claim 7, wherein:
the programmable gate is operative to selectively output one of a plurality of subsets of a working memory.

12. The method of claim 7, wherein the plurality of input parameters comprise at least one of: an input encoding type; an indication of whether a first input signal is received; an indication of whether the control signal is shared with additional programmable gates; an indication of whether the programmable gate outputs the first output signal in the absence of a control signal; and an indication of whether the control signal is evaluated against a predetermined threshold.

13. A computer program product for configuring a neurosynaptic system, the computer program product comprising a computer readable storage medium having program instructions embodied therewith, the program instructions executable by a processor to cause the processor to perform a method comprising:
reading a plurality of input parameters defining the behavior of a programmable gate;
based upon the plurality of input parameters, configuring a neurosynaptic core to provide the programmable gate, operative to receive a control signal and selectively output a first output signal based on the control signal, the control signal comprising open and close control spikes, the programmable gate configured to count the open and close spikes and to output the first output signal only when a difference between the count of open and close control spikes exceeds a predetermined threshold, wherein
the neurosynaptic core is operative to receive a first input signal, and wherein
the first output signal comprises the first input signal, the first input signal comprises a plurality of spikes, and the first input signal is rate coded.

14. The computer program product of claim 13, wherein the programmable gate outputs the first output signal in the absence of the control signal.

15. The computer program product of claim 13, wherein the control signal is shared with a second programmable gate.

16. The computer program product of claim 13, wherein selectively outputting the first output comprises evaluating the control signal against a predetermined threshold.

17. The computer program product of claim 13, wherein:
the programmable gate is operative to selectively output one of a plurality of subsets of a working memory.

18. The computer program product of claim 13, wherein the plurality of input parameters comprise at least one of: an input encoding type; an indication of whether a first input signal is received; an indication of whether the control signal is shared with additional programmable gates; an indication of whether the programmable gate outputs the first output signal in the absence of a control signal; and an indication of whether the control signal is evaluated against a predetermined threshold.

* * * * *